US012602259B2

(12) United States Patent　(10) Patent No.:　US 12,602,259 B2
Baillargeon　(45) Date of Patent:　Apr. 14, 2026

(54) RESOURCE CAPACITY MANAGEMENT IN CLOUDS

(71) Applicant: Telefonaktiebolaget LM Ericsson (publ), Stockholm (SE)

(72) Inventor: Steve Baillargeon, Toronto (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 627 days.

(21) Appl. No.: 17/916,616

(22) PCT Filed: Apr. 7, 2020

(86) PCT No.: PCT/IB2020/053323
§ 371 (c)(1),
(2) Date: Oct. 3, 2022

(87) PCT Pub. No.: WO2021/205204
PCT Pub. Date: Oct. 14, 2021

(65) Prior Publication Data
US 2023/0153162 A1　May 18, 2023

(51) Int. Cl.
*G06F 9/50*　(2006.01)
(52) U.S. Cl.
CPC ............ *G06F 9/505* (2013.01); *G06F 9/5044* (2013.01)
(58) Field of Classification Search
None
See application file for complete search history.

(56) References Cited

U.S. PATENT DOCUMENTS

| 7,032,222 B1 * | 4/2006 | Karp | ......................... G06F 9/50 |
| | | | 718/100 |
| 7,685,597 B1 * | 3/2010 | Czajkowski | .......... G06F 9/5016 |
| | | | 718/100 |
| 8,040,916 B2 * | 10/2011 | Truong | ................. H04L 47/724 |
| | | | 370/468 |

(Continued)

OTHER PUBLICATIONS

Chen et al.; "A Credit-based Allocation Method of Resource Quotas for Cloud Users"; 2014 IEEE 17th International Conference on Computational Science and Engineering; (Chen_2014.pdf; pp. 305-311) (Year: 2014).*

(Continued)

*Primary Examiner* — Hiren P Patel
(74) *Attorney, Agent, or Firm* — Weisberg I.P. Law, P.A.

(57)　ABSTRACT
A method and node of a network of clusters supporting containerized workloads running in workload cluster namespaces in communication with at least one workload cluster are disclosed. In one aspect, a method implemented in a workload cluster in a network of workload clusters supporting containerized workloads running in cluster namespaces in communication with at least one workload cluster is provided. A request is received from a cluster user quota controller, the request containing a proposed set of resource limits for a cluster namespace of the cluster user. The proposed set of resource limits to be evaluated is relayed to a cluster administrator quota controller. A request is received from a cluster administrator quota controller. The request contains a first set of resource limits selected from the proposed set of resource limits to apply to a cluster namespace of the cluster user.

20 Claims, 15 Drawing Sheets

(56)                References Cited

U.S. PATENT DOCUMENTS

| | | | | |
|---|---|---|---|---|
| 8,782,655 | B2 * | 7/2014 | Blanding | G06F 9/5083 |
| | | | | 718/104 |
| 9,201,693 | B2 * | 12/2015 | Fuller | G06F 9/50 |
| 9,384,056 | B2 * | 7/2016 | Lipchuk | G06F 9/505 |
| 10,042,661 | B1 * | 8/2018 | Emelyanov | G06F 9/45545 |
| 10,158,703 | B2 * | 12/2018 | Kurian | G06Q 10/10 |
| 10,789,098 | B1 * | 9/2020 | Lin | H04M 15/00 |
| 10,868,732 | B2 * | 12/2020 | Mishra | H04L 41/5019 |
| 11,593,172 | B2 * | 2/2023 | Rosoff | G06F 9/45558 |
| 12,020,055 | B2 * | 6/2024 | Yang | H04L 41/5051 |
| 2008/0059969 | A1 * | 3/2008 | Johnson | G06F 9/5016 |
| | | | | 718/104 |
| 2008/0244576 | A1 * | 10/2008 | Kwon | G06F 9/5077 |
| | | | | 718/1 |
| 2014/0068624 | A1 * | 3/2014 | Fuller | G06F 9/5011 |
| | | | | 718/104 |
| 2014/0075029 | A1 * | 3/2014 | Lipchuk | G06F 9/5077 |
| | | | | 709/226 |
| 2015/0188840 | A1 * | 7/2015 | Xiao | G06F 9/50 |
| | | | | 709/226 |
| 2015/0358251 | A1 * | 12/2015 | Varga | H04L 47/72 |
| | | | | 709/226 |
| 2016/0232033 | A1 * | 8/2016 | Hasegawa | G06F 9/5005 |
| 2018/0165129 | A1 * | 6/2018 | Chu | G06F 9/485 |
| 2020/0004589 | A1 * | 1/2020 | Geiger | H04L 41/0894 |
| 2020/0326984 | A1 * | 10/2020 | Wu | G06F 16/17 |
| 2020/0356376 | A1 * | 11/2020 | Lynch | G06F 9/445 |
| 2021/0149737 | A1 * | 5/2021 | An | G06F 11/3024 |
| 2021/0200594 | A1 * | 7/2021 | Kobayashi | G06F 9/542 |
| 2022/0131888 | A1 * | 4/2022 | Kanso | H04L 63/1433 |

OTHER PUBLICATIONS

Lakew et al.; "Management of Distributed Resource Allocations in Multi-cluster Environments"; 978-1-4673-4883-6/12/ ©2012 IEEE; (Lakew_2012.pdf; pp. 275-284) (Year: 2012).*

International Search Report and Written Opinion dated Jan. 26, 2021 for International Patent Application No. PCT/IB2020/053323 filed Apr. 7, 2020, consisting of 13-pages.

Cluster Autoscaler FAQ; GitHub, obtained on Jan. 16, 2020, consisting of 16-pages.

Cluster Autoscaler Introduction; GitHub, obtained on Jan. 16, 2020, consisting of 4-pages.

Resource Quotas; Kubernetes, https://kubernetes.io/docs/concepts/policy/resource-quotas/; obtained on Jan. 16, 2020, consisting of 13-pages.

Current Resource Quota API, GitHub User Content, Kubernetes, obtained on Jan. 16, 2020, consisting of 11-pages.

* cited by examiner

Use Case #3A: Cluster User Signals New Quota Target

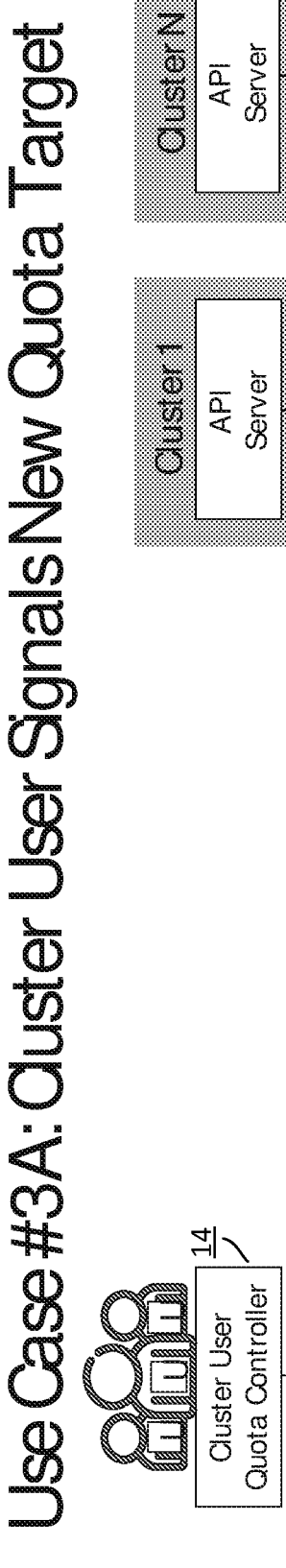

Cluster User Quota Controller
14

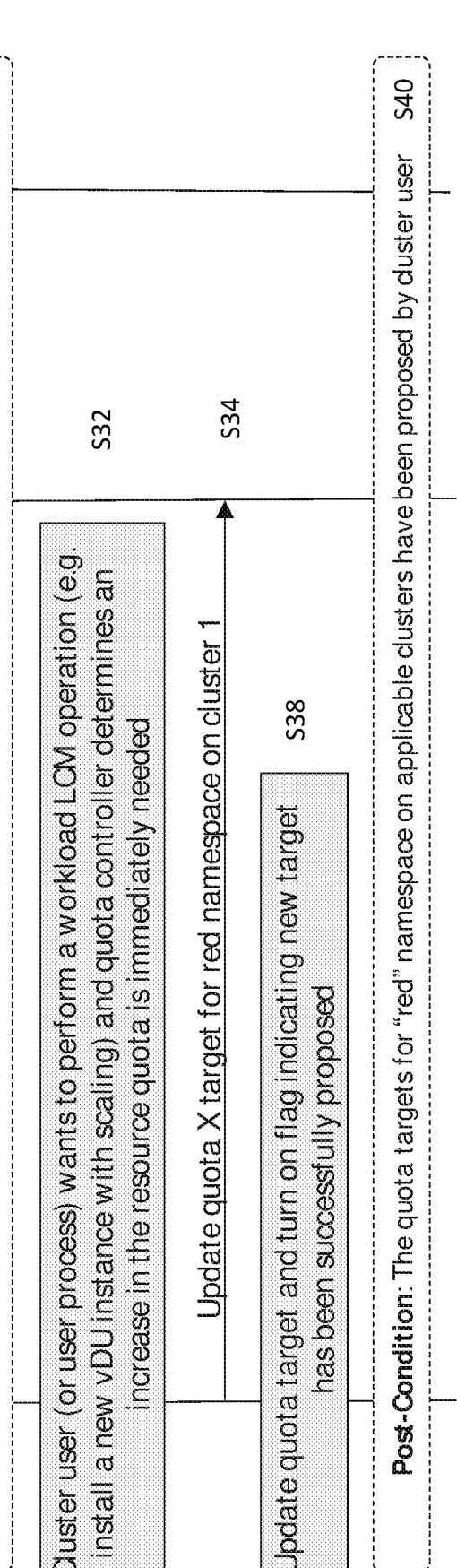

Cluster 1
API Server

Cluster N
API Server

Pre-Condition: All quotas for "red" namespace on all applicable clusters have been discovered by cluster user   S30

Cluster user (or user process) wants to perform a workload LCM operation (e.g. install a new vDU instance with scaling) and quota controller determines an increase in the resource quota is immediately needed   S32

Update quota X target for red namespace on cluster 1   S34

Update quota target and turn on flag indicating new target has been successfully proposed   S38

Post-Condition: The quota targets for "red" namespace on applicable clusters have been proposed by cluster user   S40

FIG. 4

Use Case #5: Cluster Admin Changes Cluster & Quota

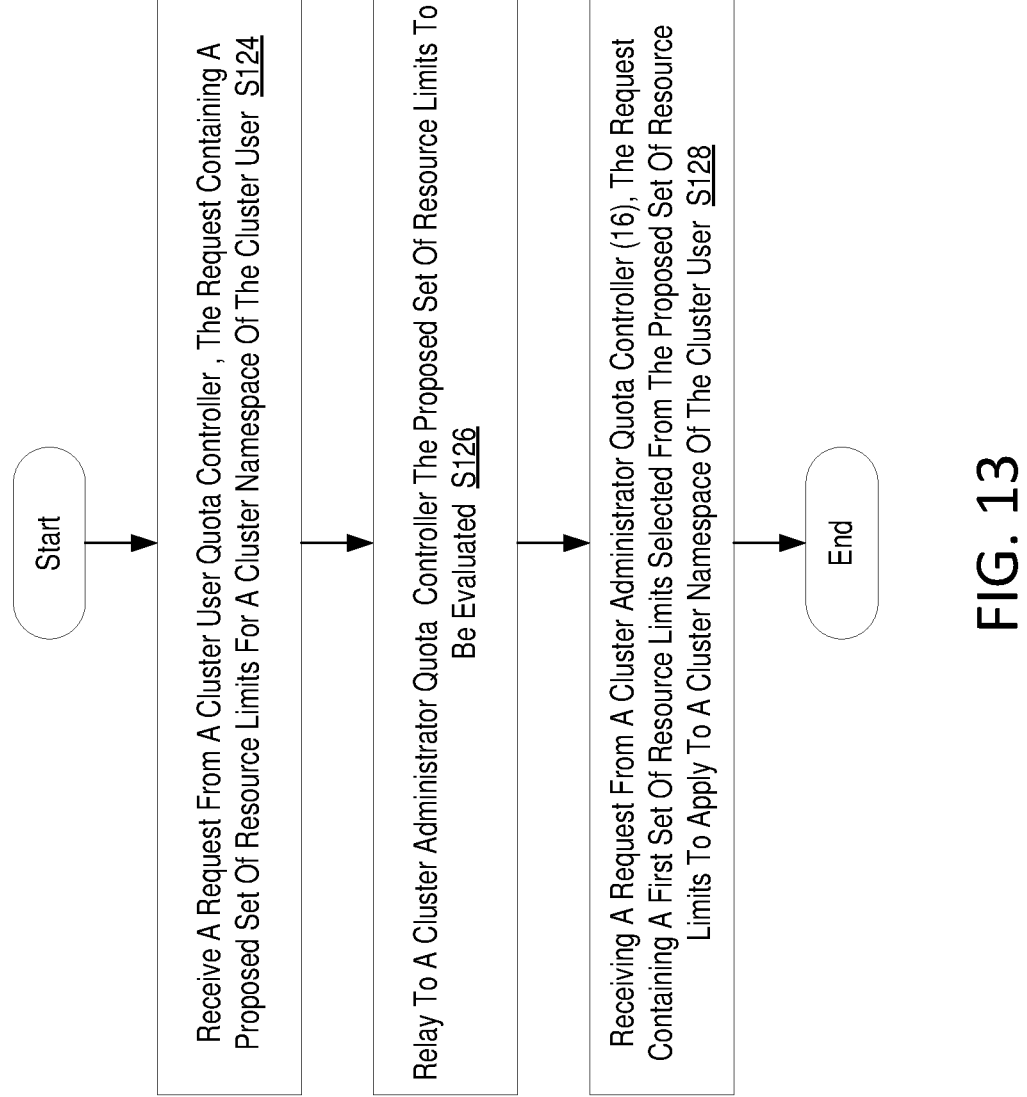

Start

Receive A Request From A Cluster User Quota Controller , The Request Containing A Proposed Set Of Resource Limits For A Cluster Namespace Of The Cluster User  S124

Relay To A Cluster Administrator Quota  Controller The Proposed Set Of Resource Limits To Be Evaluated  S126

Receiving A Request From A Cluster Administrator Quota Controller (16), The Request Containing A First Set Of Resource Limits Selected From The Proposed Set Of Resource Limits To Apply To A Cluster Namespace Of The Cluster User  S128

End

FIG. 13

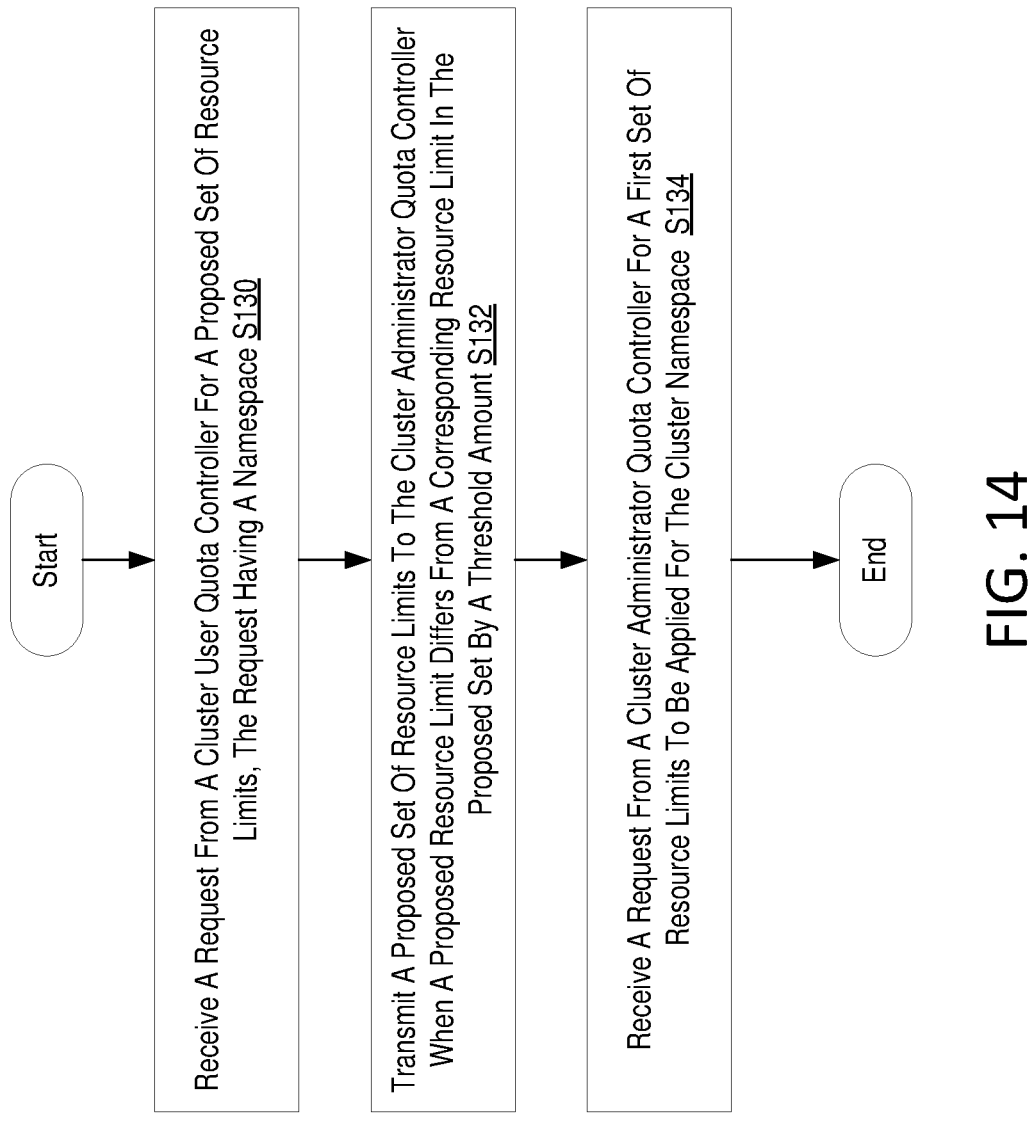

Start

Receive A Request From A Cluster User Quota Controller For A Proposed Set Of Resource Limits, The Request Having A Namespace S130

Transmit A Proposed Set Of Resource Limits To The Cluster Administrator Quota Controller When A Proposed Resource Limit Differs From A Corresponding Resource Limit In The Proposed Set By A Threshold Amount S132

Receive A Request From A Cluster Administrator Quota Controller For A First Set Of Resource Limits To Be Applied For The Cluster Namespace S134

End

FIG. 14

RESOURCE CAPACITY MANAGEMENT IN CLOUDS

CROSS-REFERENCE TO RELATED APPLICATIONS

This application is a Submission Under 35 U.S.C. § 371 for U.S. National Stage Patent Application of International Application Number: PCT/IB2020/053323, filed Apr. 7, 2020 entitled "RESOURCE CAPACITY MANAGEMENT IN CLOUDS," the entirety of which is incorporated herein by reference.

TECHNICAL FIELD

This disclosure relates to wireless communication and in particular, to management of resource capacity in network clouds.

BACKGROUND

Kubernetes (k8s) is a system for running thousands of containers in an automated, declarative, repeatable, and understandable way. Kubernetes provides a framework for deploying application code into production. From a radio access network (RAN) developer perspective, Kubernetes gives an infrastructure provider the tools to create powerful, production-ready applications to run on virtual machines or physical servers (known as workers or nodes). RAN network performance may currently rely on the worker's central processing unit (CPU)/graphic processing unit (GPU) architecture, configuration and handling of workloads and tasks as well as how much virtualized computer resources and storage are allocated to individual RAN containerized applications. Some definitions used in descriptions of k8s include the following:

k8s cluster: A cluster consists of one or more master machines and multiple worker machines or nodes. The master runs the control plane functions and coordinates between all the nodes running the actual workloads knowns as pods.

k8s pod: A pod is the smallest unit of deployment in a cluster, i.e., it is an instance of an application. A pod could run on a single container or multiple containers. Each pod has a unique Internet protocol (IP) address assigned to it. If a pod is running on multiple containers, then the containers can communicate with each other using localhost. When the containers have to communicate outside the pod, they expose a port.

k8s node: A node is a worker machine, a virtual machine (VM) or a physical machine which contains services to run pods. It is controlled by a master which coordinates between all the nodes. Each node has knowledge of its CPU, GPU (if available), memory, ephemeral storage and maximum number of pods which can be scheduled on the node.

Cluster user: one of a group of users responsible for creating and managing specific application instances (the tenant pods) running in a multi-cluster network. For example, a RAN operational team for a large Fifth Generation (5G) operator has a namespace called us-west-1 because it is managing RAN instances in k8s clusters located in the north part of the west coast in California, where 5G is also referred to as New Radio (NR), as developed by the Third Generation Partnership Project (3GPP). The cluster user is responsible for application lifecycle management including scaling and upgrading its applications.

Cluster admin: a group of users responsible for creating and managing k8s clusters and related physical components. For instance, a cluster administrator can be managing dozens of on-premises k8s clusters in the network. The cluster administrator is responsible for the cluster lifecycle management including scaling and upgrading clusters (e.g., removing or adding a cluster and/or removing or adding a new node to an existing cluster).

There are problems with existing solutions for providing k8s clusters. For example, a cluster administrator may have full control over cluster capacity, where capacity may be measured as CPU capacity, memory capacity and number of pods, for example. Although the cluster administrator may have full control over cluster capacity, the cluster administrator may not know what capacity is best for one or more clusters. This might be overcome by manual handshakes between the cluster administrator and cluster users, which may lead to a disadvantage of heavier traffic on the links between a node of the cluster administrator and master nodes of clusters. Also, in some existing implementations, the cluster administrator must monitor usage of resources of a resource quota of resources assigned to a cluster to determine a desired or required capacity to be allocated to the cluster. The monitoring of usage may be based on certain signals from the clusters (e.g., a signal indicating a number of pods in pending states). A cluster auto-scaler (CA) is a tool of the cluster administrator to find pods that cannot be scheduled, and determines if adding a new cluster node similar to other nodes of the cluster would materially aid a desired allocation of resources, while attempting to meet cluster requirements.

Other problems arise from the fact that in existing implementations, the cluster user knows what it needs in terms of resources but has no control over the resources that are allocated to it. Performing a lifecycle management (LCM) operation without previously considering available cluster capacity and resource type may trigger unwanted conditions. For example, a containerized node function (CNF) instance may be partially deployed for a potentially long duration and existing pod instances (for, e.g., services) may need to be deleted and redeployed elsewhere. One current way to signal a need for extra resources is to attempt a deployment of CNF instances.

SUMMARY

Some embodiments advantageously provide a method and system for management of resource capacity in clouds. More particularly, according to one aspect, an embodiment may enable a cluster user to use a cluster user quota controller to track and explicitly request changes related to the container resource capacity allocated to the cluster user's namespace configured across multiple k8s clusters. The requested changes are called resource quota targets. The resource quota targets are requests informing the cluster administrator to increase or decrease the container resource allocation (by adding new nodes to a cluster or allocating existing cluster capacity to other users) for a namespace on a specific cluster. This may be as desired by the cluster user to ensure proper service or application operation, performance and energy consumption. The resource quota targets are communicated "in-band" between cluster users and cluster administrators using the k8s resource quota API with new extensions. Note that in some embodiments, the resource quota controller may be based on network functions virtualization orchestrator (NFVO) or open network automation platform (ONAP) multi-cloud.

According to one aspect, a method implemented in a workload cluster in a network of workload clusters supporting containerized workloads running in cluster namespaces in communication with at least one workload cluster is provided. The method includes receiving a request from a cluster user quota controller the request containing a proposed set of resource limits for a cluster namespace of the cluster user. The method includes relaying to a cluster administrator quota controller the proposed set of resource limits to be evaluated. The method further includes receiving a request from a cluster administrator quota controller, the request containing a first set of resource limits selected from the proposed set of resource limits to apply to a cluster namespace of the cluster user.

According to this aspect, in some embodiments, the first set of resource limits includes a limit on at least one of the following: a number of processing units, an available memory capacity, am ephemeral storage capacity, an available permanent storage capacity, a number of pods that can exist in the cluster namespace and a number of persistent volume claims that can exist in the namespace. In some embodiments, the request includes a status statement that specifies the namespace and current resource usage by a workload cluster managed by the cluster user. In some embodiments, relaying the proposed set of resource limits is performed only when a resource limit in the proposed set of resource limits exceeds a corresponding current resource limit by a threshold amount. In some embodiments, the threshold amount is a lower limit on an amount of resources that will be changed in response to the proposed set of resource limits. In some embodiments, the proposed set of resource limits is transmitted with a current usage of resources by a workload cluster managed by the cluster administrator quota controller. In some embodiments, the method further includes requesting a notification of a proposed set of resource limits from the cluster administrator quota controller for each of at least one workload cluster.

According to another aspect, a workload cluster in a network of workload clusters supporting containerized workloads running in cluster namespaces in communication with at least one workload cluster in communication with at least one workload cluster is provided. The workload cluster is configured to receive a request from a cluster user quota controller, the request containing a proposed set of resource limits for a cluster namespace of the cluster user. The workload cluster is further configured to relay to a cluster administrator quota controller the proposed set of resource limits to be evaluated. The workload cluster is further configured to receive a request from a cluster administrator quota controller 16, the request containing a first set of resource limits selected from the proposed set of resource limits to apply to a cluster namespace of the cluster user.

According to this aspect, in some embodiments, the first set of resource limits includes a limit on at least one of the following: a number of processing units, an available memory capacity, an ephemeral storage capacity, an available permanent storage capacity, a number of pods that can exist in a namespace and a number of persistent volume claims that can exist in the namespace. In some embodiments, the request includes a status statement that specifies the namespace and current resource usage by a workload cluster managed by the cluster user. In some embodiments, the relaying of the proposed set of resource limits is performed when a resource limit exceeds a correspondent current resource limit by a threshold amount. In some embodiments, the threshold amount is a lower limit on an amount of resources that will be changed in response to the proposed set of resource limits. In some embodiments, the proposed set of resource limits is transmitted with a current usage of resources by a workload cluster. In some embodiments, the workload cluster is further configured to request notification of a proposed set of resource limits from the cluster administrator quota controller for each of at least one workload cluster.

According to yet another aspect, a method implemented in a workload cluster in a network of workload clusters supporting containerized workloads running in cluster namespaces is provided. The method includes receiving a request from a cluster user quota controller for a proposed set of resource limits, the request having a namespace. The method includes transmitting a proposed set of resource limits to the cluster administrator quota controller when a resource limit in the first set of resource limits differs from a corresponding resource limit in the proposed set by a threshold amount. The method further includes receiving a request from a cluster administrator quota controller for a first set of resource limits to be applied for the cluster namespace.

According to this aspect, in some embodiments, the received request contains a current use of resources by the workload cluster. In some embodiments, the method further includes transmitting a notification of a proposed set of resource limits for each of at least one workload cluster.

According to another aspect, a workload cluster in a network of workload clusters supporting containerized workloads running in a cluster of namespaces is provided. The workload cluster is configured to receive a request from a cluster user quota controller for a proposed set of resource limits, the request having a namespace. The workload cluster is further configured to transmit a proposed set of resource limits to the cluster administrator workload cluster when a resource limit in the first set of resource limits differs from a corresponding resource limit in the proposed set by a threshold amount. The workload cluster is further configured to receive a request from a cluster administrator quota controller for a first set of resource limits to be applied for the cluster namespace.

According to this aspect, in some embodiments, the received request contains a current use of resources by the workload cluster. In some embodiments, the transceiver is further configured to transmit a notification of a proposed set of resource limits for each of at least one workload cluster.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 shows an example use case 3A.

FIG. 13 is a flowchart of an example process implemented in a workload cluster for selecting resource limits from a proposed set of resource limits;

FIG. 14 is a flowchart of an example process in a workload cluster for changing resource limits.

DETAILED DESCRIPTION

Figure 1:
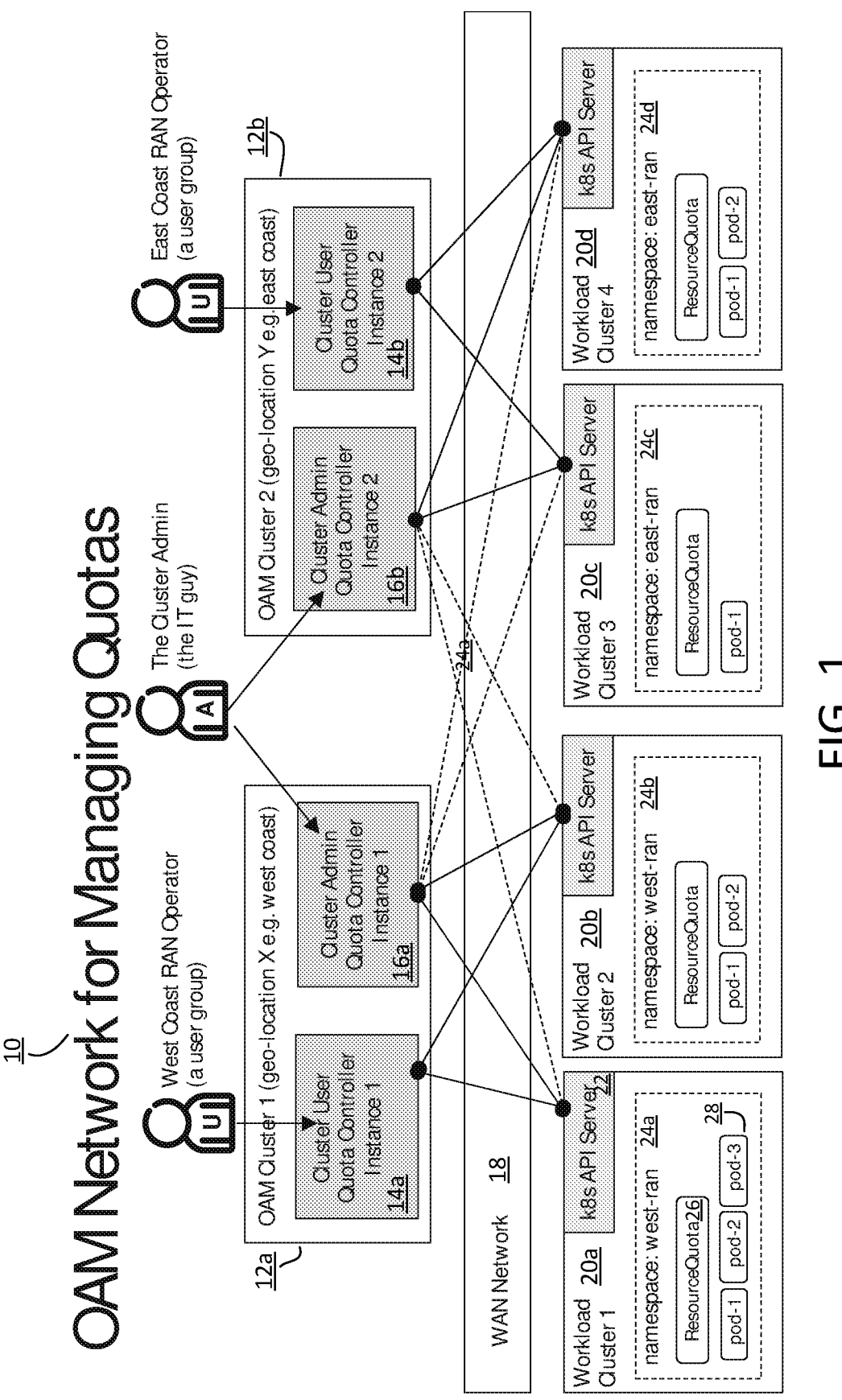
FIG. 1 is a diagram of an Operations, Administration and Maintenance (OAM) network 10 that may be employed to implement methods described herein for managing resource quotas.

Before describing in detail exemplary embodiments, it is noted that the embodiments reside primarily in combinations of apparatus components and processing steps related to management of resource capacity in clouds, where a cloud includes the Internet or other wide area network. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, cluster capacity request and allocation using resource quotas allow a cluster user to quickly discover current cluster resources throughout a network and effectively communicate resource requirements to the cluster administrator, thus ensuring that a certain amount of resources are readily available at the right time and to the right cluster as desired for optimal resource allocations for RAN/5G operations. In some embodiments, implementation of methods described herein may allow operators (infrastructure users) added predictability and available capacity in a k8s cluster network. Solutions described below may use resource quotas deployed for each namespace. Some embodiments are applicable to single tenant and multi-tenant cluster operations. Some embodiments are applicable to all pod and/or container resources, including basic and extended resource types, and permanent volumes. Some embodiments are applicable to CNF LCM operations requesting new and/or additional pod instances. Such operations may include Install, Manual Scale Out, Automatic Scale Out (with or without high speed access (HPA)). Some embodiments are applicable to RAN capacity upgrades including resources allocated to individual RAN network slices. Some embodiments are applicable to handling cluster failure scenarios that require intervention by the cluster administrator. Some embodiments are applicable to handling decreases in cluster capacity to achieve energy savings or to enable transfer of cluster capacity to another namespace in the same cluster. Some embodiments do not interfere with operation of a conventional cluster autoscaler (CA) and may be applicable to triggering auto cluster scaling.

Note that references to a workload manager or cluster manager refer to a network node having functions described herein. The workload manager and cluster manager may each be implemented by a microprocessor and/or dedicated circuitry and memory. As used herein, a cluster administrator may also be referred to as a cluster manager or NFV orchestrator. A cluster user may also be referred to as a workload manager or VNF manager.

As used herein, a resource quota, defined by a ResourceQuota object, provides constraints that limit aggregate resource consumption per namespace. The resource quota can limit the quantity of objects that can be created in a namespace by type, as well as by limiting the total amount of computing resources that may be consumed by resources in that project. In some embodiments, resource quotas may be employed as follows:

Different teams work in different namespaces. Currently, this is voluntary, but support for making this mandatory via an access control list (ACLs) is planned;

The cluster administrator creates one ResourceQuota for each namespace;

Cluster users create resources (pods, services, etc.) in the namespace, and the resource quota system tracks usage to ensure those resources does not exceed hard resource limits defined in a ResourceQuota;

If creating or updating a resource quota violates a resource quota constraint, the request may fail with HTTP status code 403 FORBIDDEN with a message explaining the constraint that would have been violated; and/or If a resource quota is enabled in a namespace for computing resources like CPU and memory, users may specify requests or limits for those values; otherwise, the resource quota system may reject pod creation.

Referring now to the drawing figures, where like elements are like numbered, there is shown in FIG. 1 a diagram of an Operations, Administration and Maintenance (OAM) network 10 that may be employed to implement methods described herein for managing resource quotas. The OAM network 10 may include one or more OAM clusters 12a, 12b, collectively referred to as OAM clusters 12. OAM cluster 12a has a cluster user quota controller instance 1 14a and OAM cluster 12b has a cluster user quota controller instance 2 14b. OAM cluster 12a has a cluster administrator quota controller instance 1 16a and OAM cluster 12b has a cluster administrator quota controller instance 2 16b. Note that there may be less than two OAM clusters 12 or more than two OAM clusters 12 in some embodiments. Note that the user quota controllers 14 and the administrator quota controllers 16 may be implemented in the same location or in different remote locations within the same or different geo-locations. In the example of FIG. 1, OAM cluster 1 12a may be on the west coast and govern clusters in the west, where OAM cluster 2 12b may be on the east coast and govern clusters in the east. The OAM clusters 12 may be in communication with a network 18 such as a wide area network (WAN) which is in turn in communication with one or more workload clusters. The network 18 may be a private Internet network, for example. FIG. 1 shows four workload clusters 1, 20a, 2, 20b, 3, 20c and 4, 20d, herein referred to collectively as workload clusters 20. In some embodiments, there may be less than or more than four workload clusters in communication with the network 18. In some embodiments, an OAM cluster 12 may be in communication with more than one workload cluster 20. In FIG. 1, workload cluster 1 20a and workload cluster 2 20b are served at least by OAM cluster 1 12a and workload cluster 3 20c and workload cluster 4 20d are served at least by OAM cluster 2 12b. Each workload cluster 20 may have a k8s application program interface (API) server 22 which provides an interface with the WAN network 18. A workload cluster 20 may also have, associated with a cluster namespace 24, a resource quota 26, and one or more pods 28. For example, workload cluster 1 20*a* may have 3 pods whereas workload cluster 2 20*b* may have only two pods. As noted above, each pod is an instance of an application. In some embodiments, each instance corresponds to use of the application by an operator. Thus, FIG. 1 shows a first namespace 24*a* associated with a first workload cluster 20*a*, a second namespace 24*b* associated with a second workload cluster 20*b*, and so forth. Note that the cluster user quota controllers 14, the cluster administrator quota controllers 16, and the workload clusters 20 may be implemented to include logic and control circuitry and/or a processor operating according to computer instructions. Is it also noted that, although network 18 is referred to as a WAN, implementations are not limited to such. It is contemplated that network 18 can be implemented to include local area network (LAN) and/or personal area network (PAN) elements and devices.

The following use cases (UC) are described with reference to FIGS. 2-10

| UC # | Use Case Description |
|------|----------------------|
| 1 | A cluster administrator decides the resource types and limits the total amount of resources each user community (namespace) can consume in each cluster. See FIG. 2. |
| 2 | A cluster user wants to know the currently available resources the cluster user can consume in the cluster user's namespace running on one or more clusters and optimize the use of all available resources in the cluster network. See FIG. 3. |
| 3 | A cluster user wants to signal the required resource types and capacity for a namespace on a given cluster. |
| 3A | The cluster user wants to signal an increase of my resource quota to complete the current and related LCM operation on a given cluster. See FIG. 4. |
| 3B | The cluster user wants to signal an increase of my resource quota to handle future LCM operations on a given cluster. See FIG. 5. |
| 3C | The cluster user wants to signal an increase of the cluster user's resource quotas to handle network capacity upgrade on one or more clusters. See FIG. 6. |
| 3D | The cluster user wants to signal a reduction of my resource quota to save energy (or transfer capacity to another namespace) on a given cluster. See FIG. 7. |
| 4 | The cluster administrator wants to detect when new resource types and capacity are requested on a given cluster by a user community (namespace). See FIG. 8. |
| 5 | The cluster administrator wants to control when the new resources are ready to be consumed by a user community. See FIG. 9. |
| 6 | A cluster user wants to know when new resources are added to the cluster user's namespace running on one or more clusters. See FIG. 10. |

Figure 2:
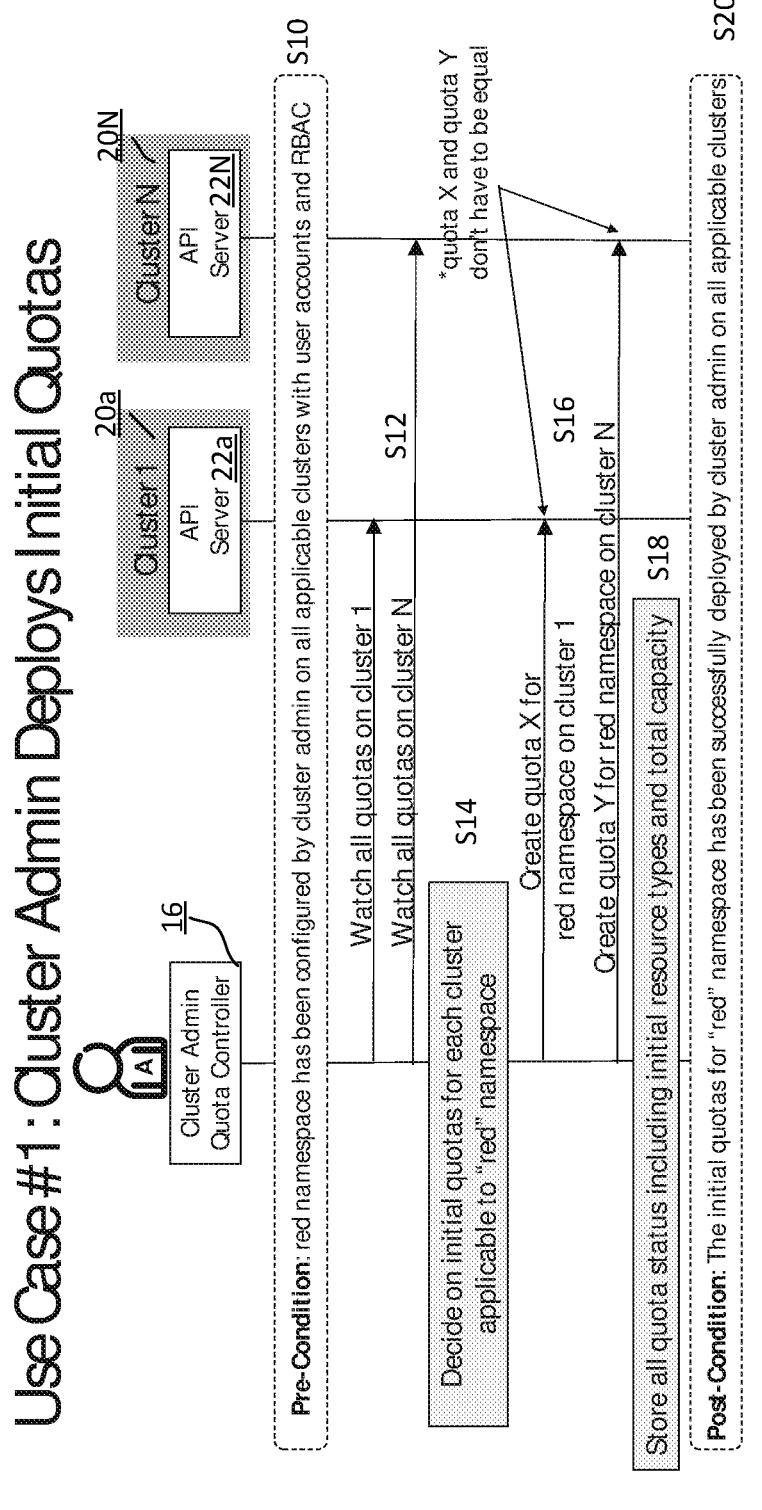
FIG. 2 shows an example use case 1.

A more detailed description of each of these use cases is provided with reference to their respective figures. Referring to FIG. 2 (Use Case 1), a cluster administrator quota controller 16 of an OAM cluster 12 is in communication with multiple workload clusters 20*a* through 20N. For convenience and ease of understanding, only two of the multiple workload clusters 20 are shown. There may be more or fewer workload clusters 20. Each workload cluster 20 has a respective k8s API server 22. In FIG. 2, the cluster administrator, via a machine implementing workload manager functionality, decides the resource types and limits the total amount of resources that each user community (namespace) can consume in each cluster. As a precondition (S10) for the example namespace, "red," the red namespace is configured by the cluster administrator on applicable clusters with user accounts and role based access control (RBAC). In step S12, resource quotas are watched on each cluster. In step S14, the cluster administrator decides on initial resource quotas for each cluster applicable to the "red" namespace. In step S16, a resource quota is created for namespace, red, on each cluster. In step S18, the cluster administrator stores resource quota status information including initial resource types and total capacity. As a post condition (S20) the initial resource quotas for the red namespace has been successfully deployed by the cluster administrator on applicable clusters.

Figure 3:
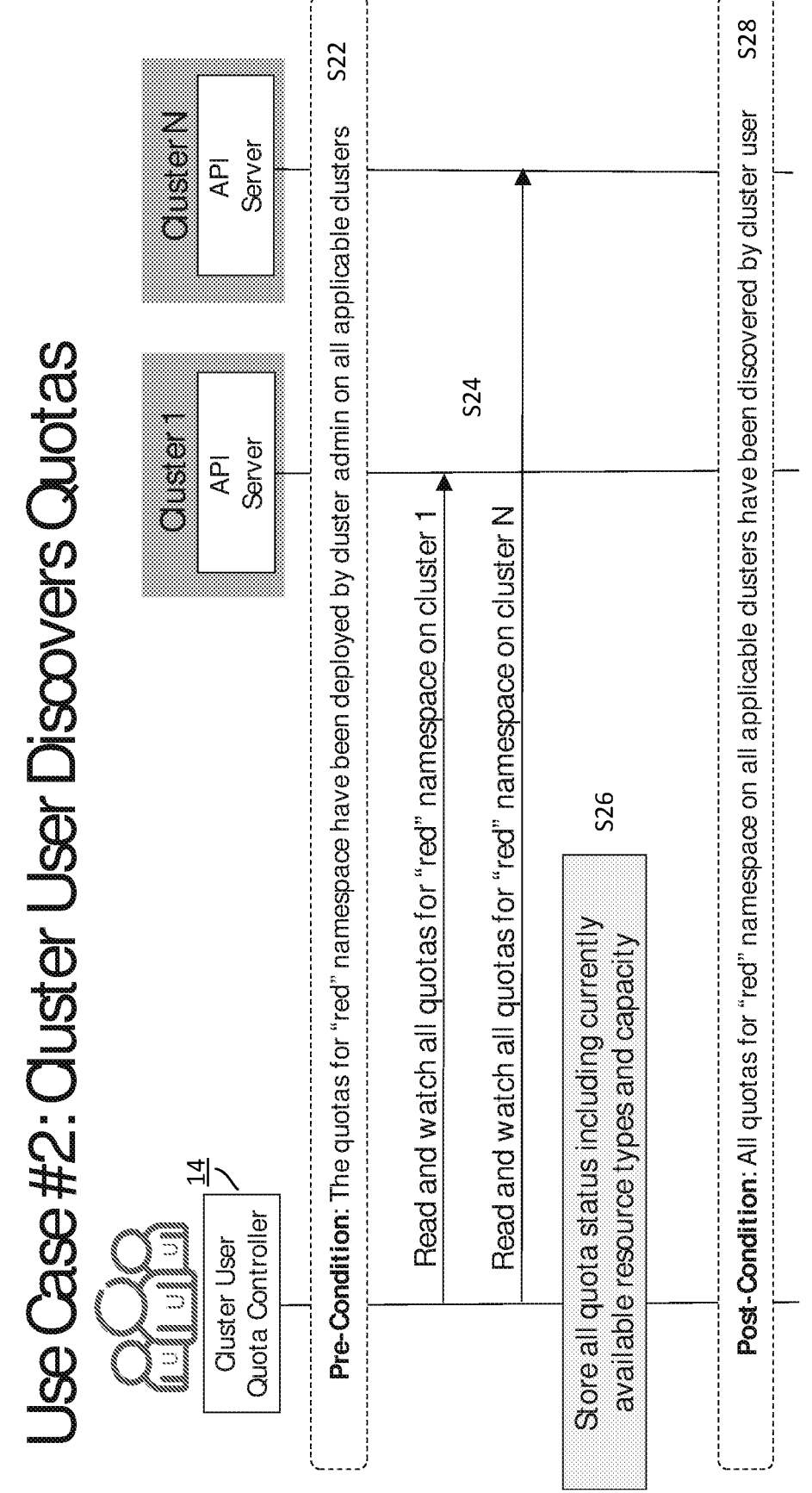
FIG. 3 shows an example use case 2.

Referring to FIG. 3 (use case 2), as a precondition (S22) to the cluster user learning currently available resources that it can consume in the red namespace, the resource quotas for the red namespace have been deployed by the cluster administrator on applicable clusters. In step S24, the cluster user, via the cluster user quota controller 14 reads and watches the resource quotas for the red namespace on each cluster. In step S26, the cluster user stores resource quota status information including currently available resource types and capacity. As a post condition (S28), resource quotas for the red namespace on applicable clusters have been discovered by the cluster user. Note that the cluster administrator quota controller 16 may obtain and track resource quota changes by sending a get request or sending watch parameters to the k8s API servers 22. Alternatively, or in addition, the cluster administrator quota controller 16 may continuously or repeatedly send a get request, for example, once per minute and the k8s API server 22 may immediately respond with a current view of the resource quota.

Referring to FIG. 4 (use case 3A), as a precondition (S30) to the cluster user signaling an increase of its resource quota to complete a current and related LCM operation on a given cluster, the cluster user has discovered resource quotas for the red namespace on applicable clusters. In step S32, the cluster user desires to perform a workload LCM operation, (e.g., by installing a new vDU instance with scaling), and the cluster user quota controller 14 determines that an increase in the resource quota is immediately needed. In step S134, the cluster user updates a resource quota X target for the red namespace on cluster 1, for example. In step S38, the cluster user updates the resource quota target and turns on a flag indicating that a new target has been successfully proposed. As a post condition (S40), the cluster user has proposed resource quota targets for the red namespace on applicable clusters.

Figure 5:
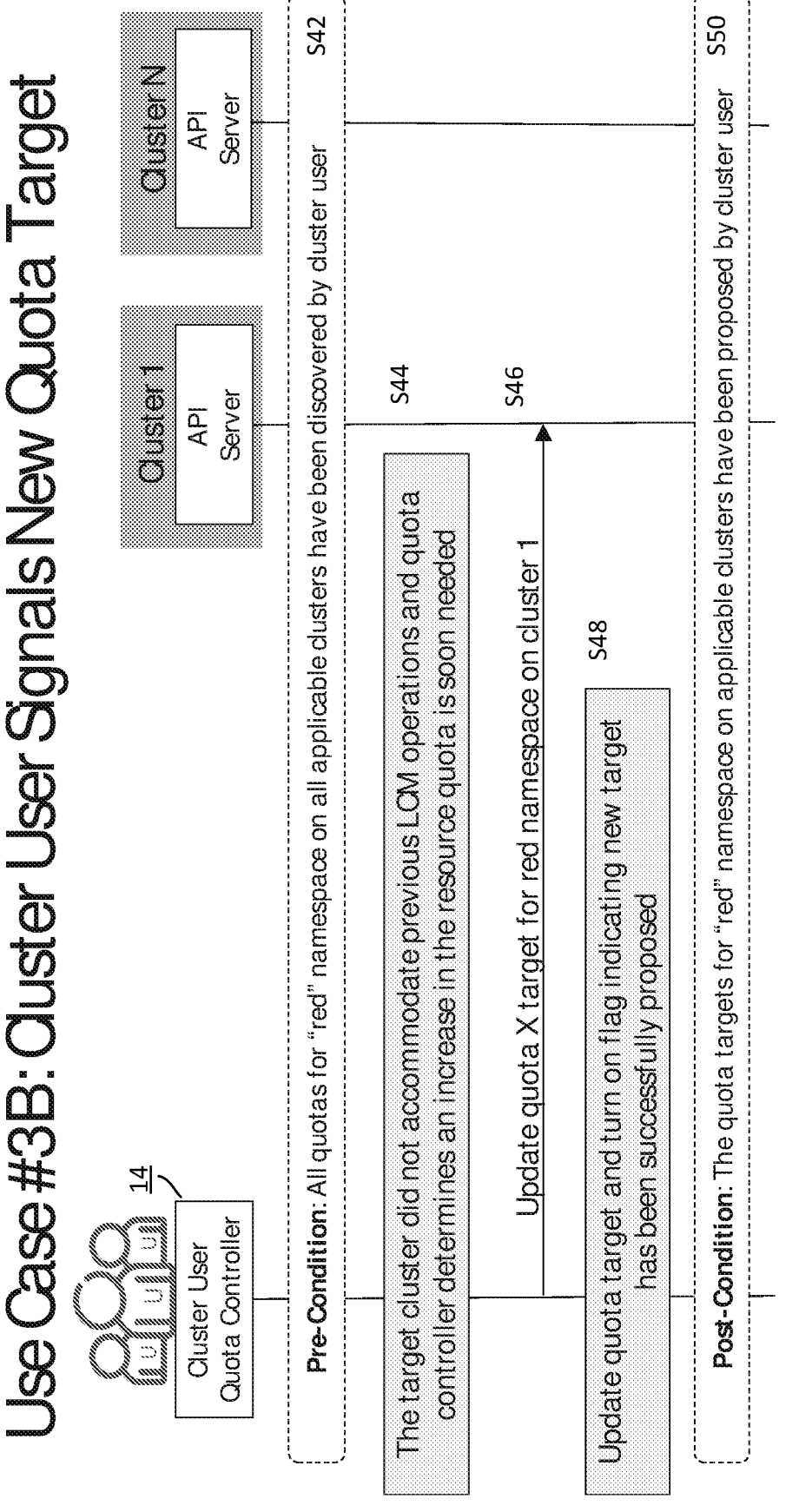
FIG. 5 shows an example use case 3B
Figure 6:
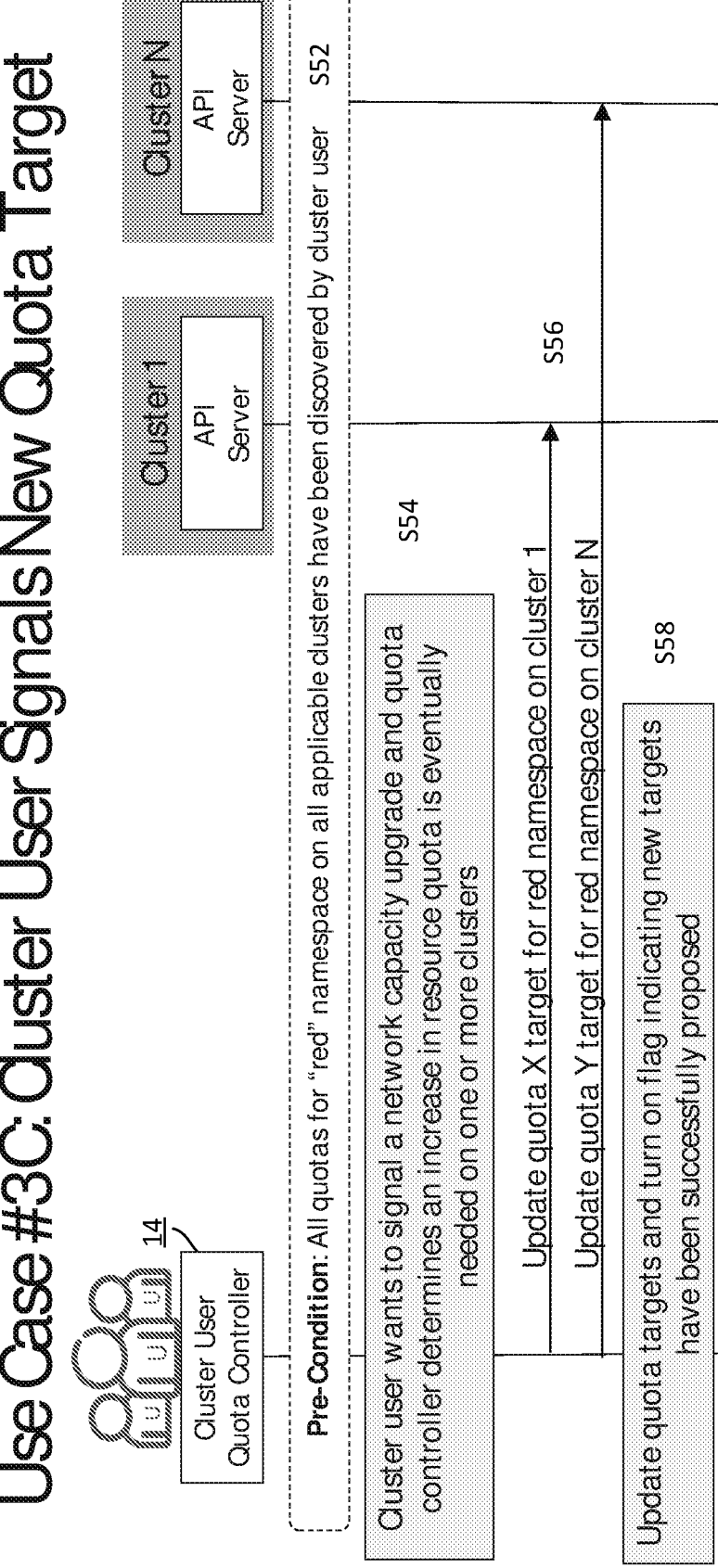
FIG. 6 shows an example use case 3C.

Referring to FIG. 5 (use case 3B), as a precondition (S42) to a cluster user signaling an increase of its resource quota to handle future LCM operations on a given cluster, resource quotas for the red namespace on applicable clusters have been discovered by the cluster user. In step S44, it is determined that a particular cluster did not accommodate previous LCM operations and the cluster user quota controller 14 determines that an increase in the resource quota is soon needed, for example. In step S46, the cluster user updates resource quota X target for the red namespace on cluster 1, for example. In step S48, the cluster user updates the resource quota target and turns on a flag indicating that a new target has been successfully proposed. As a postcondition (S50), the resource quota targets for the red namespace on applicable clusters Referring to FIG. 6 (use case 3C), as a precondition (S52) to a cluster user signaling an increase of its resource quotas to handle a network capacity upgrade on one or more clusters, resource quotas for the red namespace on applicable clusters have been discovered by the cluster user. In step (S54), the cluster user wants to signal a network capacity upgrade and the cluster user quota controller 14 determines that an increase in resource quota is eventually needed on one or more clusters. In steps S56, the cluster user updates the resource quota X target for the red namespace on cluster 1 and updates the resource quota Y target for the red names space on cluster N. In step S58, the cluster user updates its resource quota targets and turns on a flag indicating that new resource quota targets have been proposed. As a postcondition (S60), the cluster user has proposed resource quota targets for the red namespace on applicable clusters.

Figure 7:
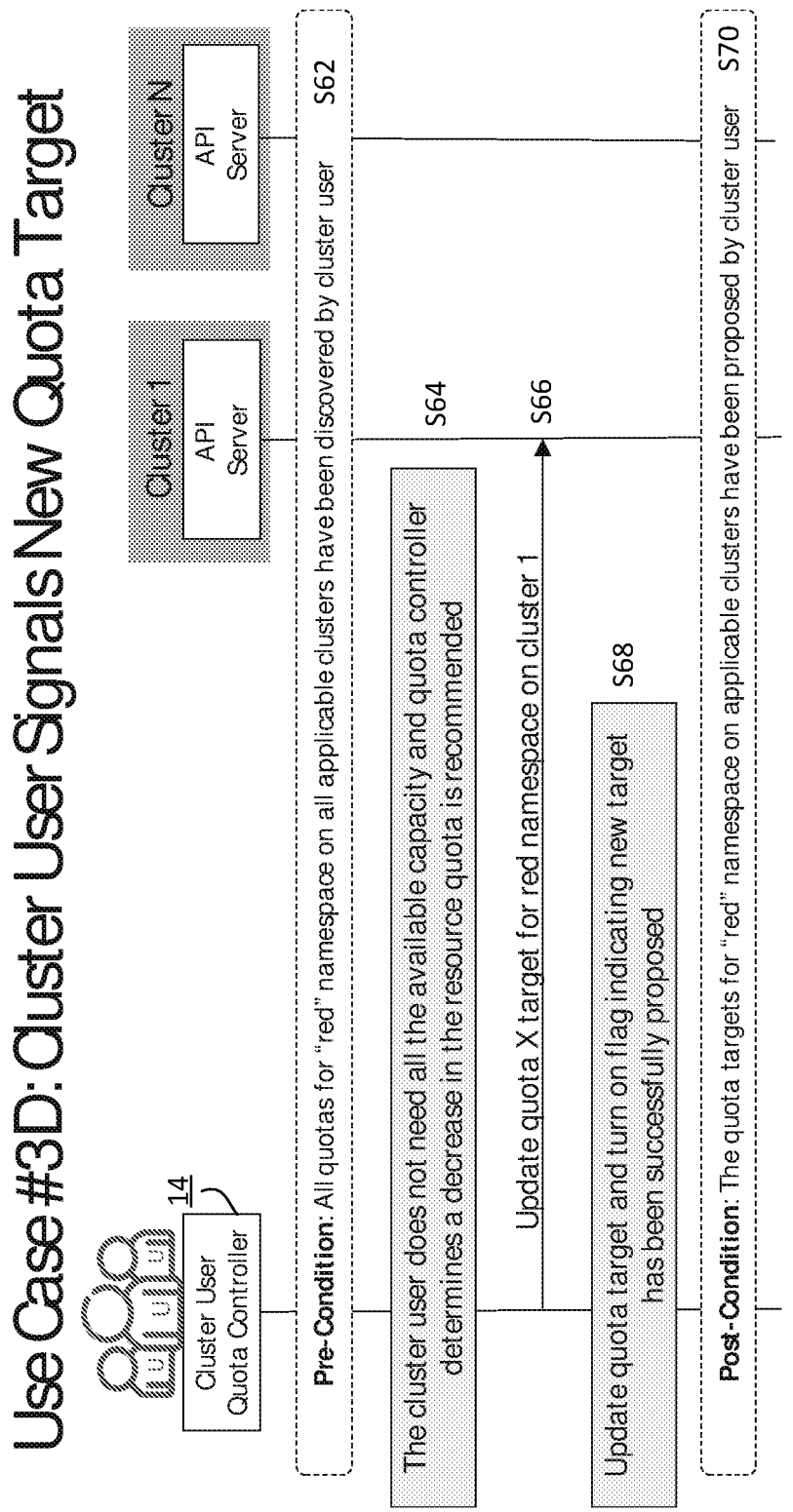
FIG. 7 shows an example use case 3D.

Referring to FIG. 7 (use case 3D), as a precondition (S62) to a cluster user signaling a reduction of its resource quota to save energy (or transfer capacity to another namespace) on a given cluster, the cluster user has discovered resource quotas for the red namespace on applicable clusters. In step S64, the cluster user does not need all the available capacity and the cluster user quota controller 14 determines that a decrease in the resource quota is recommended. In step S66, the cluster user updates the resource quota target and turns on a flag indicating that a new resource quota target has successfully been proposed. As a postcondition (S70) the resource quota targets for the red namespace on applicable clusters have been proposed by the cluster user.

Figure 8:
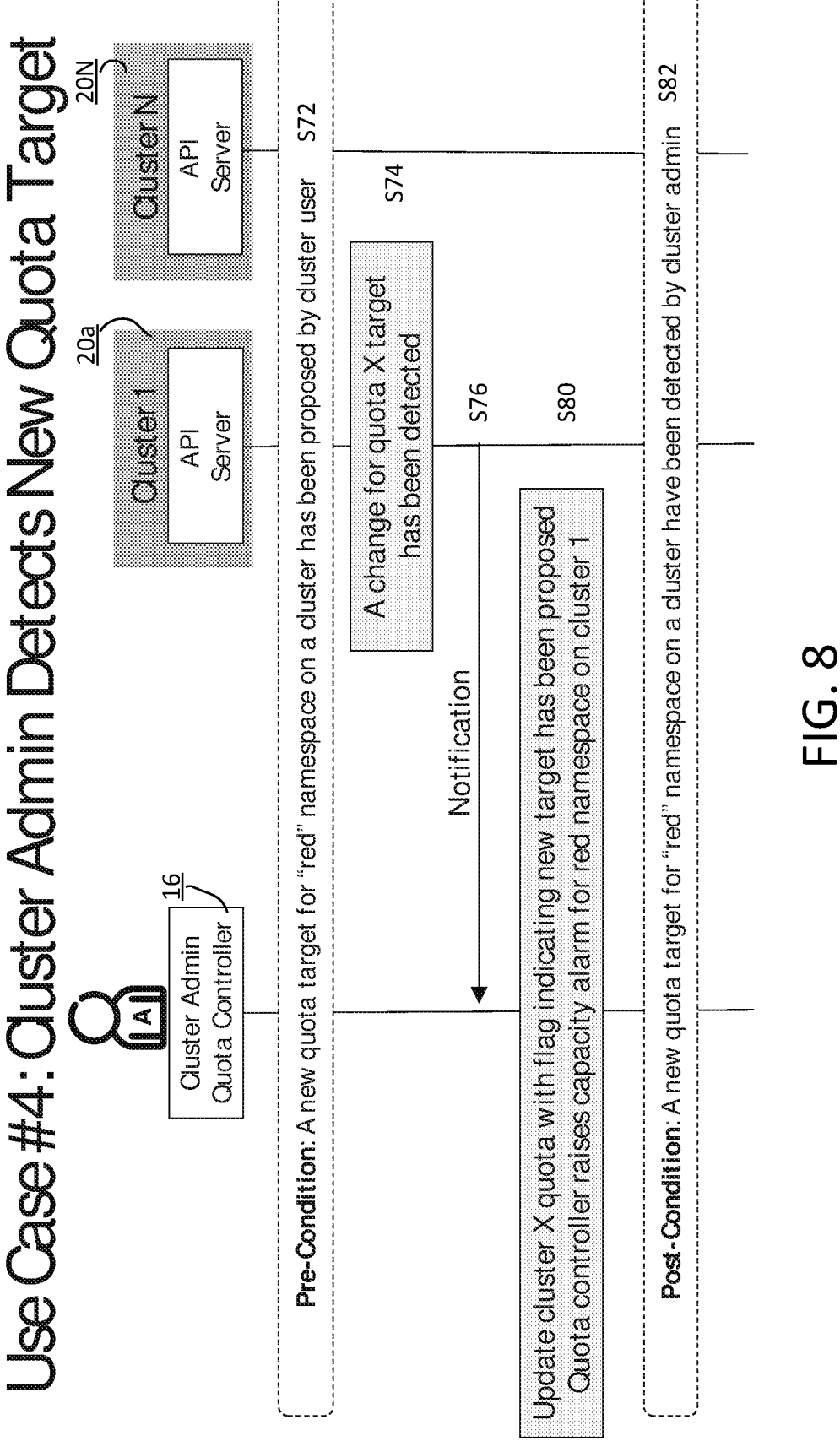
FIG. 8 shows an example use case 4.

Referring to FIG. 8 (use case 4), as a precondition (S72) to the cluster administrator detecting when new resource types and/or capacity are requested on a given cluster by a user community (namespace), the cluster user has proposed a new resource quota for the red namespace on the given cluster. In step 74, the workload cluster 20*a* detects a change for the resource quota X target. In step S76, the workload cluster 20*a* notifies the cluster administrator quota controller 16 of the requested new resource quota. In step S80, the cluster administrator updates the cluster X resource quota with a flag indicating that the new resource quota target has been proposed and the cluster administrator quota controller 16 raises a capacity alarm for the red namespace on the workload cluster 20*a*. As a postcondition (S82), the new resource quota target for the red namespace on a cluster has been detected by the cluster administrator.

Figure 9:
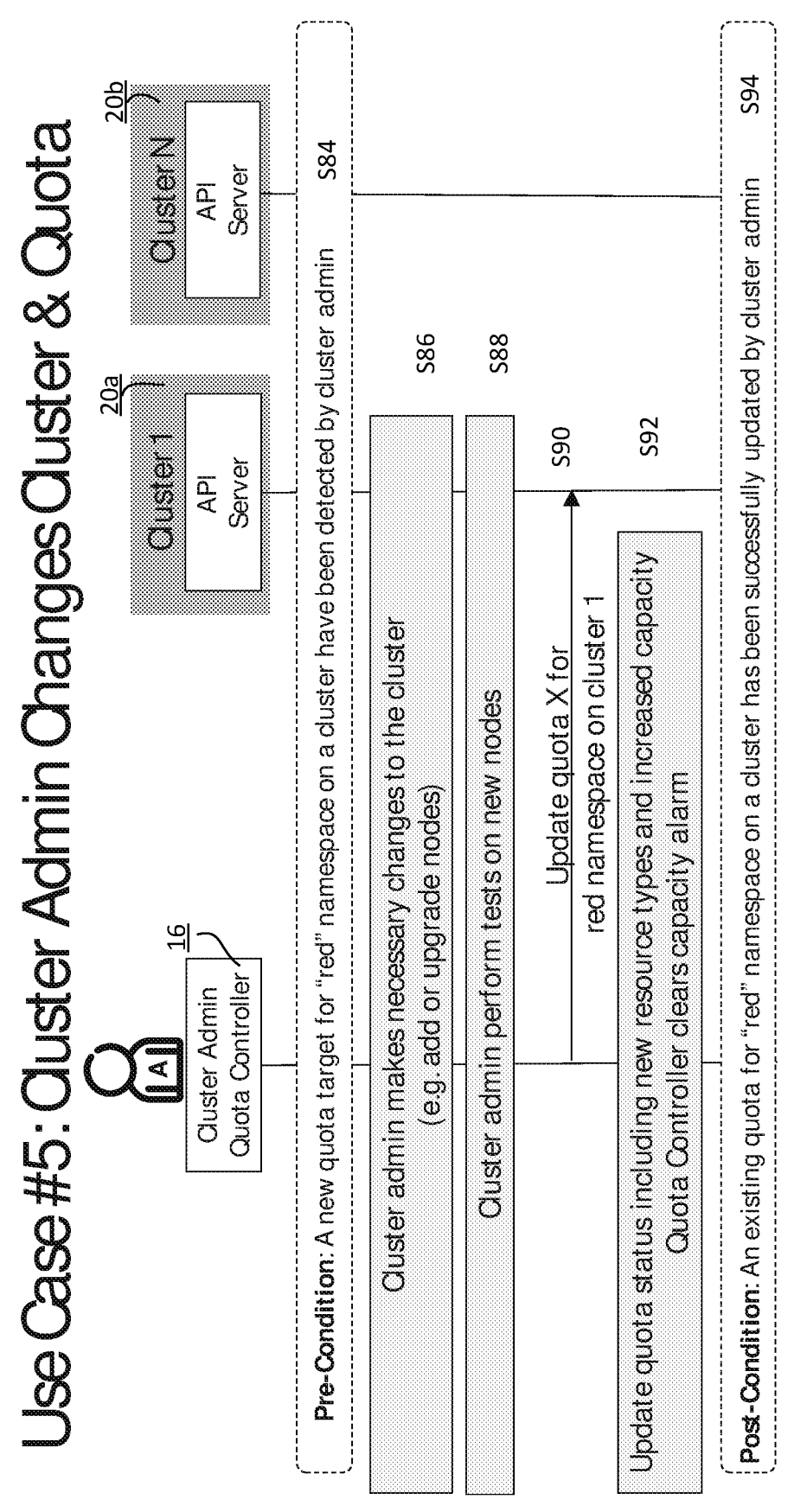
FIG. 9 shows an example use case 5.

Referring to FIG. 9 (use case 5), as a precondition (S72) to the cluster administrator controlling when the new resources are ready to be consumed by a user community (namespace), the cluster administrator has detected a new resource quota target for the namespace on a cluster. In step S86, the cluster administrator makes changes to the cluster to achieve the new resource quota target (for example, by adding or upgrading nodes in the cluster). In step S88, the cluster administrator performs tests on new nodes in the cluster). In step S90, the cluster administrator updates resource quota X for the red namespace on workload cluster 20*a*. In step S92, the cluster administrator updates a resource quota status to include new resource types and increased capacity and the cluster administrator quota controller 16 clears a capacity alarm. As a post condition (S94), an existing resource quota for the red namespace on a cluster has been successfully updated by the cluster administrator.

Figure 10:
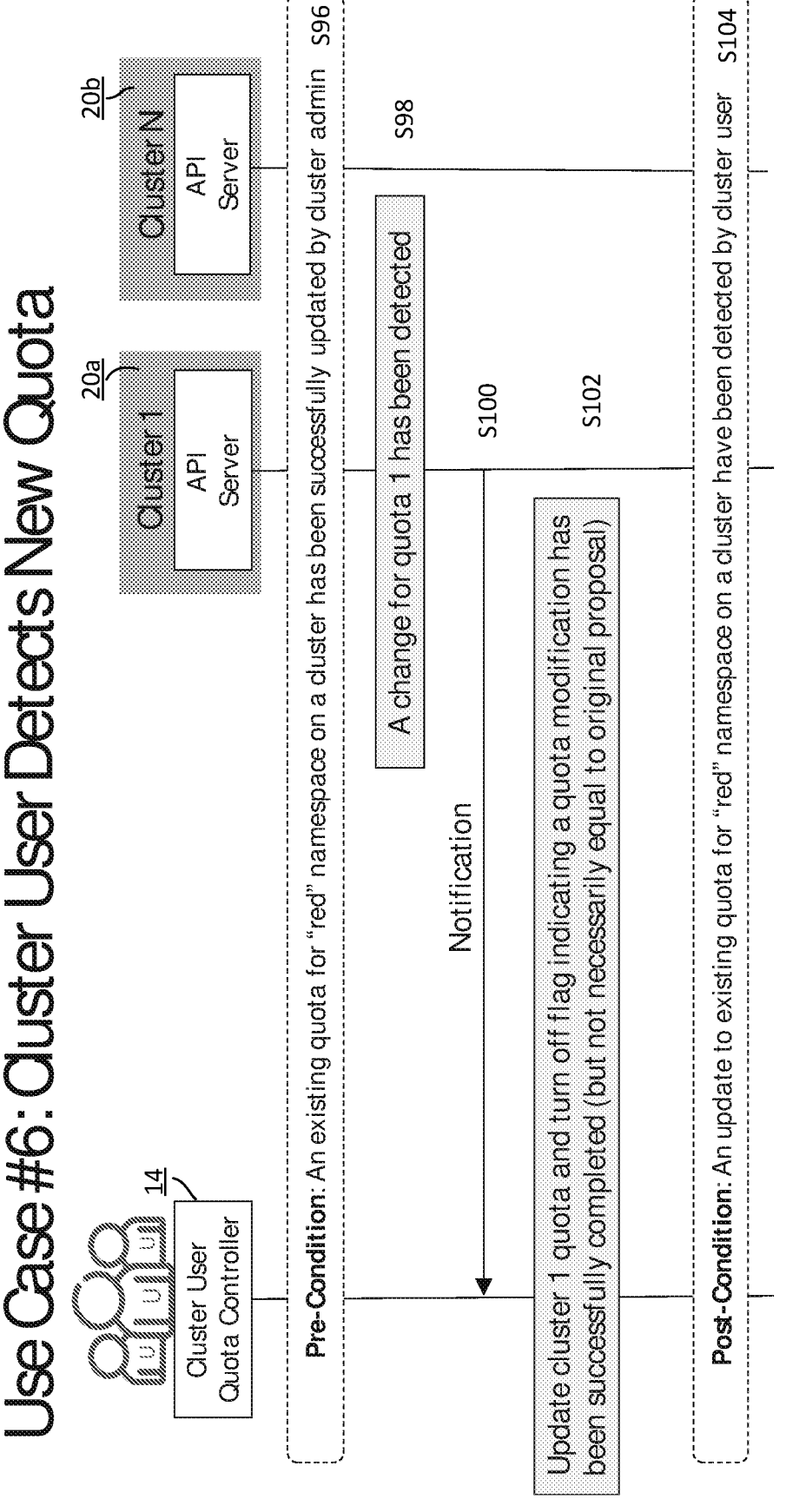
FIG. 10 shows an example use case 6.

Referring to FIG. 10 (use case 6), as a precondition (S96) to a cluster user to learn when new resources are added to its namespace running on one or more clusters, the cluster administrator has successfully updated an existing resource quota for the red namespace. In step S96, a change for a resource quota for workload cluster 20*a* has been detected. In step S100, the cluster user quota controller 14 is notified of the change. In step S102, the cluster user updates the cluster resource quota for workload cluster 20*a* and turns off a flag indicating that a resource quota modification has been successfully completed (even if the resource quota modification is not equal to the requested change). As a postcondition (S104), the cluster user has detected the update to an existing resource quota for the red namespace on a cluster.

Some embodiments described herein may impose pod and/or container resource requirements. In some embodiments, a cluster user consumes container resources produced by nodes in a k8s cluster. Container resources are classified in 2 categories:

1. "Basic" resources are defined in the kubernetes/io domain:
    cpu, memory, hugepages, ephemeral-storage;
2. Extended resources are defined outside the kubernetes/io domain:
    e.g., nvidia.com/gpu The cluster user may "request" container resources in the pod specification, (spec. containers [ ].resources):
    spec.containers[ ].resources is usually specified by the app containerized node function (CNF) provider;
    Note: permanent volume resources may be defined outside the pod specification.

Although "requests" can only be specified on individual containers in some embodiments, it is convenient to refer to pod resource "requests". A pod resource "request" for a particular resource type is the sum of the resource "request" of that type for each container in the pod.

In some embodiments, resources are not required to be requested or specified in the pod specification:
    If resources are not specified, the pod will get a "best-effort" amount of compute resources (CPU and memory) from the node without any support for hugepages and node-level extended resources.

If a minimum amount of a given normal resource is required, then the cluster user may request the minimum amount in the pod specification by specifying the resource name and amount. If an extended resource is required, then the cluster user may request it in the pod specification by specifying the extended resource name and amount. In some embodiments, a pod is only scheduled if all the resource "requests" are satisfied including CPU, memory and extended resources:
    The pod remains may in the PENDING state if a node cannot satisfy all the resource requirements; or
    The pod is not created and a pod controller is waiting for an increase in resource quota.
    Some pod/container resource types include the following:

| Resource Name | Description |
| --- | --- |
| cpu | The number of CPUs (cores) requested by the pod/container; |
| memory | The memory size requested by the pod/container; |
| hugepages | The huge page memory size (of a page size) requested by the pod/container; |
| ephemeral-storage | The ephemeral storage size requested by the pod/container; |
| <domain-name>/<other-extended-resource> Example: nvidia.com/gpu | Extended resource requested by the pod/container; Example: The number of NVDIA GPUs requested by the pod/container |

A pod specification example may include the following pseudocode:

```
apiVersion: v1
kind: Pod
metadata:
  name: my-pod
spec:
  containers:
    - name: my-container
```

-continued

```
    image: my-image
      resources: # Compute Resources required by this container. Cannot
be updated.
        requests: # Requests describes the minimum amount of compute
resources required.
          # If Requests is omitted for a container, it defaults to Limits if
          that is
          # explicitly specified, otherwise to an implementation-defined
          value.
          cpu: "500m"
          memory: "128Mi"
        limits: #Limits describes the maximum amount of compute
resources allowed.
          memory: "128Mi"
        #Omitted for brevity
```

Resource Quotas

The cluster administrator may create one or more resource quotas for each namespace configured on each applicable cluster. The resource quota specification defines the desired hard limits to enforce for the namespace on a given cluster. Cluster users create resources (pods, services, etc.) in the namespace, and the resource quota system tracks resource allocation (not the same as resource utilization) to ensure that the resource allocation does not exceed hard resource limits defined in the resource quota specification. If creating or updating a resource violates a resource quota constraint, the request may fail and the hypertext transmission protocol (HTTP) status code 403 FORBIDDEN is sent with a message explaining the constraint that would have been violated. If a resource quota is enabled in a namespace for basic computing resources like CPU and memory, cluster users may specify requests or limits for those values; otherwise, the resource quota system may reject pod creation. The resource quota may be independent of the cluster capacity and may be expressed in absolute units. If the cluster administrator adds nodes to a cluster, this does not automatically give each namespace cluster user the ability to consume more resources. Also, a resource quota or the sum of the resource quotas can be made larger than the total capacity of the cluster. In this case, there may be contention for resources, which may be handled on a first-come-first-served basis. The resource quota may create no restrictions around nodes: pods from several namespaces may run on the same node.

Figure 11:
FIG. 11 is a flow chart of an example life cycle of a resource quota.

An example of a lifecycle of a resource quota is shown in the flowchart of FIG. 11. FIG. 11 shows deployment followed by deletion of a specific workload type called job. The use of a k8s job in FIG. 11 is to illustrate the automatic trigger of a notification indicating a change in the resource quota usage as requested by the previous watch call. FIG. 11 is applicable to using a k8s StatefulSet. Other well-known cluster controllers for managing pods on a k8s cluster include Deployment and DaemonSet, and the disclosure is not limited to what is shown in FIG. 11 and described herein. The process of FIG. 11 may be applied to these other cluster controllers, as well. The process begins with creating the red namespace (Step S106), followed by deploying the red team quota in the red namespace (Step S108). The process includes inspecting a red team quota usage before deploying any workloads (Step S110). This step may be followed by deploying StatefulSet in the red namespace (Step S112). The process may include inspecting the red team quota usage after deploying StatefulSet (Step S114). The process may also include deleting StatefulSet+permanent volume claim (PVC) and inspecting red team resource quota usage (Step S116). The process may further include deploying a job (optionally, with an active deadline of 60 seconds, for example), in the red namespace (Step S118). The process may also include sending a watch request for a resourceQuotasAPI object in the red namespace (Step S120). The process may also include waiting to receive notification from a k8s API server 22 after or when a job expires (Step S122).

An example of a resource quota specification is given by the following YAML manifest example:

```
apiVersion: v1
kind: ResourceQuota
metadata:
  name: red-team-quota
  namespace: red-team
spec:
  hard: # Desired limits specified by the cluster administrator for each
resource type in the namespace on a given cluster
    cpu: "500"
    memory: 100Gi
    pods: "20"
Some resource quota categories may include the following:
  — Category #1) Total amount of pod (container) resource types
    allocated to the namespace;
  — Category #2) Total sum of pod (container) requests and limits per
    resource type available in the namespace;
  — Category #3) Total sum of storage requests available in the
    namespace; and/or
  — Category #4) Maximum number of object counts per resource type
    allocated to the namespace.
```

In some embodiments, the resource quota has hard limits that may be defined as follows:

| Limit Name | Description |
| --- | --- |
| spec.hard.cpu | The total number of CPUs (cores) allocated to the namespace; |
| spec.hard.memory | The total memory size allocated to the namespace; |
| spec.hard.hugepages- | The total huge page memory size (of a page size) allocated to the namespace; |
| spec.hard.ephemeral-storage | The total ephemeral storage size allocated to the namespace; |
| spec.hard.<domain-name>/gpu | The total number of GPUs allocated to the namespace. |

In some embodiments, resource quota application program interface (API) operations may include the following:

| Operation | HTTP Verb | Path |
| --- | --- | --- |
| List or watch resource quotas | GET | /api/v1/resourcequotas |
| Create a resource quota in a namespace | POST | /api/v1/namespaces/{namespace}/resourcequotas |
| List or watch resource quotas in a namespace | GET | /api/v1/namespaces/{namespace}/resourcequotas |
| Delete resource quotas in a namespace | DE-LETE | /api/v1/namespaces/{namespace}/resourcequotas |
| Read a resource quota in a namespace | GET | /api/v1/namespaces/{namespace}/resourcequotas/{name} |
| Partially update a resource quota in a ns | PATCH | /api/v1/namespaces/{namespace}/resourcequotas/{name} |
| Replace resource quota in a namespace | PUT | /api/v1/namespaces/{namespace}/resourcequotas/{name} |
| Delete a resource quota in a namespace | DE-LETE | /api/v1/namespaces/{namespace}/resourcequotas/{name} |
| Read status of the specified resource quota | GET | /api/v1/namespaces/{namespace}/resourcequotas/{name}/status |

-continued

| Operation | HTTP Verb | Path |
|---|---|---|
| Partially update status of the specified resource quota | PATCH | /api/v1/namespaces/{namespace}/resourcequotas/{name}/status |
| Replace status of the specified resource quota | PUT | /api/v1/namespaces/{namespace}/resourcequotas/{name}/status |

In some embodiments, a resource quota status indicates the actual enforced resource quota and its current usage in a given namespace and cluster pair. The resource quota status also provides two additional items of information that may be useful to the cluster users:

1. Pod/Container resource types that are supported or available in the namespace in a given cluster:
   A resource type that is not explicitly specified may also be supported/available;
2. Available namespace capacity per resource type in a given cluster is equal to:
   status.hard.{resource-type}—status.used.{resource-type}

The following pseudocode is a resource quota status YAML running instance example:

```
apiVersion: v1
kind: ResourceQuota
metadata:
  annotations:
    kubectl.kubernetes.io/last-applied-configuration: |
{"apiVersion":"v1","kind":"ResourceQuota","metadata":{"annotations":{ },"name":"r
ed-team-quota","namespace":"red-
team"},"spec":{"hard":{"cpu":"500","memory":"100Gi","pods":"20"}}}
  creationTimestamp: "2019-11-10T15:07:24Z"
  name: red-team-quota
  namespace: red-team
    resourceVersion: "17133"
    selfLink: /api/v1/namespaces/red-team/resourcequotas/red-team-quota
    uid: cd001c40-03cb-11ea-a4dd-0242ac11004b
spec:
  hard:
    cpu: "500"
    memory: 100Gi
    pods: "20"
status: # Status indicates the actual enforced resource quota and its current usage
  hard:
    cpu: "500"
    memory: 100Gi
    pods: "20"
  used:
    cpu: "0"
    memory: "0"
    pods: "0"
```

In some embodiments, changes to a resource quota may need to exceed a threshold before a change to allocated resources is made. This may result in a reduction of a volume of notifications while allowing respective quota controllers to have a more or less accurate view of the available resources in each resource quota, namespace or cluster. This may allow a cluster controller 30 to decide where to substantiate a new virtual distributed unit (DU) or a virtual control plane (CP)-CP or virtual CP-user plane (UP) on a cluster.

In some embodiments, the following enhancements to the resource quota specification include a new field called spec.target which holds target limits designed by the cluster user for each resource type in the namespace. Enhancements may also include a new resource quota API operation: PUT/GET/PATCH/api/v1/namespaces/{namespace}/resourcequotas/{name}/target, where having a separate API sub-resource "/target," allows the cluster administrator to grant permission to cluster users to change/target but without the rights to change the parent sub-resource "/resourcequotas/{name}." The API resource, /target, may include a proposed set of resource limits requested by the cluster user quota controller.

In some embodiments, the cluster administrator monitors changes to the resource quota target. If a new target is proposed, the cluster administrator could make the necessary changes when possible:

Examples: increase resource type capacity, add support for new resource type, etc.

The cluster user may also monitor changes to the resource quota status:

If resource types and available capacity are satisfactory, the cluster user may proceed with wanted workload related life cycle management (LCM) operations;

If not, then the cluster user may perform a different action (or set of actions):

Examples may include: raising an alarm, automatically selecting a smaller CNF flavor, selecting another cluster, contacting cluster administrator, etc.

In accordance with the above disclosure, an example of a new resource quota specification is as follows:

```
apiVersion: v1
kind: ResourceQuota
metadata:
  name: red-team-quota
    namespace: red-team
  spec:
    hard:
      cpu: "500"
      memory: 100Gi
      pods: "20"
    target:
      cpu: "1000"
      memory: 200Gi
```

As used herein, the term cluster administrator may also be known as a cluster operator, cluster provider, cloud admin, cloud operator, cloud provider, container orchestration platform manager and may include anyone responsible for planning and managing a Kubernetes cluster.

Managing a cluster may include several tasks related to the lifecycle of a cluster:

creating a new cluster;

configuring and adding workers;

upgrading the cluster's master and worker nodes;

performing node maintenance (e.g. kernel upgrades);

upgrading the Kubernetes API version of a running cluster; and designing for high-availability clusters.

The cluster administrator is specifically responsible for managing the cluster-scoped API resources like node (including node labels) and namespace. The cluster administrator is also responsible for creating user accounts and role-based access control to each namespace including namespaced resources like Role and RoleBinding.

The cluster administrator is also responsible for creating and managing ResourceQuota and LimitRange for each namespace running on a cluster. The cluster administrator usually has full administrative rights to all cluster resources including namespaced resources, in some embodiments. Further, API operations by the cluster administrator can be performed by a separate orchestrator or controller (e.g., NFVO, ONAP).

As used herein, the term cluster user may also be known as a tenant or an applications operation engineer, for example, and may include persons responsible for planning and managing the workloads (applications) running on a cluster. The cluster user is usually part of an operations team, user community or user group. A company or organization may setup different teams and some teams may have dedicated clusters while other teams may share clusters. Managing applications may include several tasks related to the lifecycle of CNFs and microservices:

creating CNF or microservice instances;

Healing and upgrading CNF or microservice instances; and

Monitoring, scaling and terminating CNF or micro service instances.

A cluster user may be allocated one or more namespaces on each cluster needed to run the cluster user's instances. A cluster user may be specifically responsible for managing the workload related namespaced API resources like Service, StatefulSet.Deployment, Pod, ConfigMap and Secret within its namespace(s). The cluster user usually has administrative rights to workload related resources within its own namespace(s). The cluster user (or a management function under its control) selects the k8s cluster that will host its instances. API operations by a cluster user can be performed by a separate orchestrator or controller (e.g. virtual node function manager (VNFM), open network automation platform (ONAP) or a microservice running within the CNF instance). Note: For certain organizations or environments, the cluster user may also be the cluster administrator.

Figure 12:
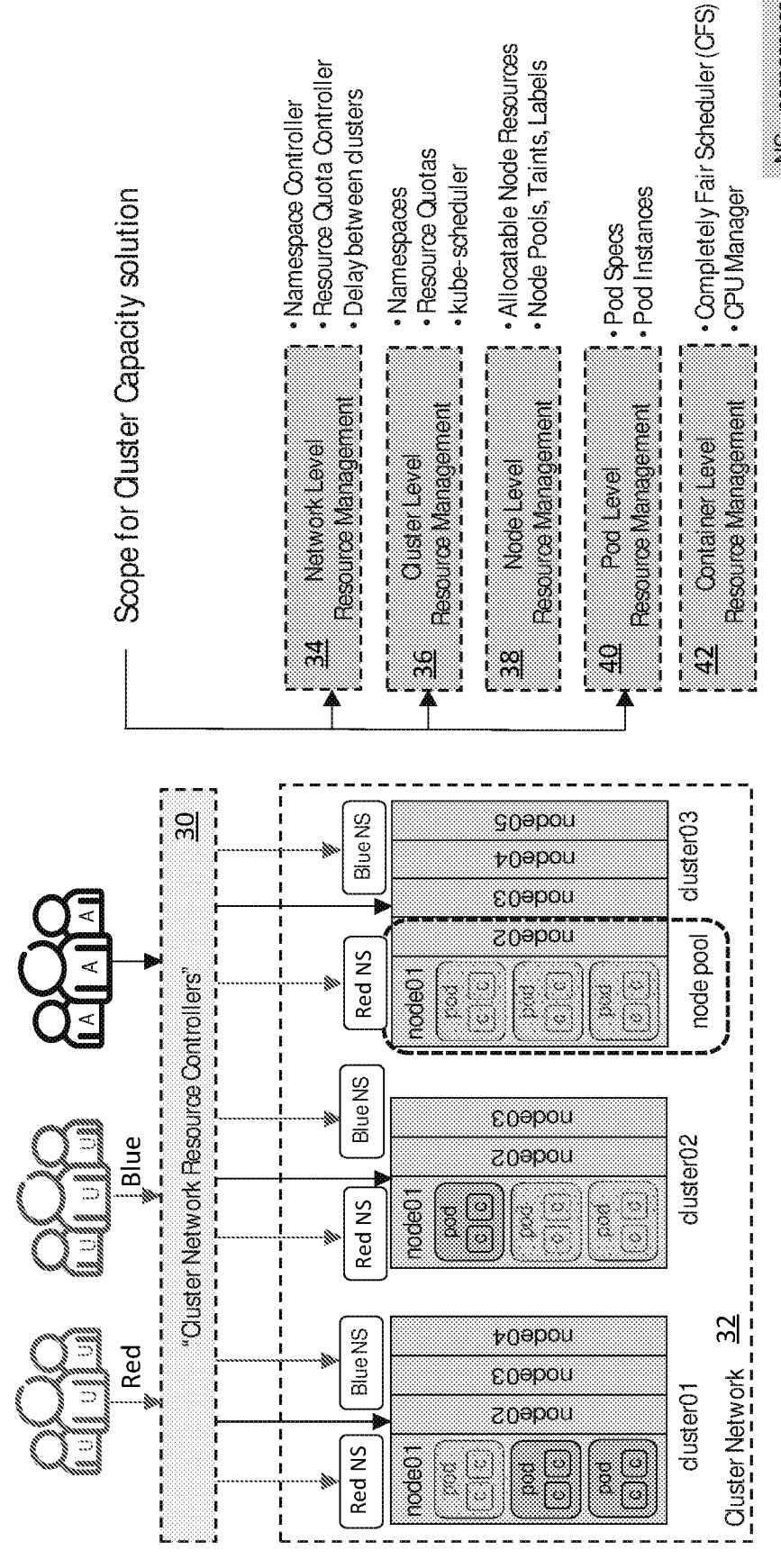
FIG. 12 is a diagram of example cluster network resource management layers.

Implementation of some embodiments may include layers of cluster network resource management, an example of which is shown in FIG. 12. In FIG. 12, the dark pods correspond to the "blue" NS and the stippled, lighter pods correspond to the "red" NS referred to herein. A group of cluster network resource controllers 30 may include cluster administrators and/or cluster users, and may jointly and/or individually operate a network cluster 32 having clusters of nodes, each node having one or more pods. Management of resources for cluster network control may be implemented at the network level 34, the cluster level 36, the node level 38, the pod level 40 and the container level 42.

Some embodiments include a method for a tenant or cluster user to influence or control the capacity and types of pod/container resources allocated to the cluster user's namespace across a multi-cluster network infrastructure managed by a cluster administrator. The changes in resource capacity may be used by the cluster user to ensure the right resources are available on the right cluster at the right time to successfully perform the current and future CNF operations. The changes in resource capacity may also be intended for simplifying network capacity upgrade, handling failure conditions and releasing cluster capacity for energy conservation or re-allocation to other namespaces managed by the same cluster user. Such method may enable the cluster user to monitor the available resource capacity in a namespace in each cluster as well as to discover when new resources are readily available. Such method may also enable the cluster user to signal the required resource types and capacity for its namespace in each cluster. Such method may further enable the cluster admin to detect when new the resource types and capacity are requested by a cluster user and to control when the new installed resources are consumed by the target cluster user.

An example YAML file that is created and transferred to each k8s cluster by the cluster administrator is as follows:

```
"#resourcequota-example-template.yaml
apiVersion: v1
kind: ResourceQuota
metadata:
  name: red-team-quota
  namespace: red-namespace
spec:
  hard: hard are the desired hard limits requested by the cluster admin for
  each resource type in the namespace.
    requests.cpu: 100 Across all pods in the namespace, the sum of CPU
  (cores) requests cannot exceed this value.
    requests.nvidia.com/gpu: 0 Across all pods in the namespace, the sum
  of GPU requests cannot exceed this value.
    requests.memory: 100Gi Across all pods in the namespace, the sum of
  memory requests cannot exceed this value.
    requests.ephemeral-storage:  1000Gi Across all pods in the namespace,
  the sum of ephemeral-storage requests cannot exceed this value.
    requests.storage:  10000Gi Across all persistent volume claims in the
  namespace, the sum of storage requests cannot exceed this value.
    pods:  100 The total number of pods that can exist in the namespace.
    persistentvolumeclaims: 100 The total number of persistent volume
  claims that can exist in the namespace."
```

This YAML file may be transmitted over the network 18 from the cluster administrator quota controller 16 to the workload clusters 20.

An example YAML file that specifies the running resource quota configuration when the resourcequota-example-template.yaml file given above has been applied to the k8s cluster by the cluster administrator, is as follows:

```
"#resourcequota-example-running-config.yaml
apiVersion: v1
kind: ResourceQuota
metadata:
  annotations:
    kubectl.kubernetes.io/last-applied-configuration: |
```

-continued

```
{"apiVersion":"v1","kind":"ResourceQuota","metadata":{"annotations":{ },"name":"r
ed-team-quota","namespace":"red-
namespace"},"spec":{"hard":{"persistentvolumeclaims":100,"pods":100,"requests.cp
u":100,"requests.ephemeral-
storage":"1000Gi","requests.memory":"100Gi","requests.nvidia.com/gpu":0,"requests
.storage":"10000Gi"}}}
  creationTimestamp: "2020-01-25T17:05:27Z"
  name: red-team-quota
  namespace: red-namespace
  resourceVersion: "25450"
  selfLink: /api/v1/namespaces/red-namespace/resourcequotas/red-team-quota
  uid: e2324455-3f94-11ea-9c91-0242ac11002e
spec:
  hard:
    persistentvolumeclaims: "100"
    pods: "100"
    requests.cpu: "100"
    requests.ephemeral-storage: 1000Gi
    requests.memory: 100Gi
    requests.nvidia.com/gpu: "0"
    requests.storage: 10000Gi
status: #Status indicates the actual enforced resource quota and its current usage
  hard:
    persistentvolumeclaims: "100"
    pods: "100"
    requests.cpu: "100"
    requests.ephemeral-storage: 1000Gi
    requests.memory: 100Gi
    requests.nvidia.com/gpu: "0"
    requests.storage: 10000Gi
  used:
    persistentvolumeclaims: "0"
    pods: "0"
    requests.cpu: "0"
    requests.ephemeral-storage: "0"
    requests.memory: "0"
    requests.nvidia.com/gpu: "0"
    requests.storage: "0""
```

This YAML file may be queried or watched by both the cluster administrator and the cluster user.

An example YAML file that is similar to the resource-quota-example-template.yaml file given above, but with a new section called "target" that is added by a cluster user, may be given as follows:

```
"#resourcequota-example-template-with-target.yaml
apiVersion: v1
kind: ResourceQuota
metadata:
  name: red-team-quota
  namespace: red-namespace
spec:
  hard: #hard are the desired hard limits requested by the cluster admin for each
resource type in the namespace.
    requests.cpu: 100 #Across all pods in the namespace, the sum of CPU (cores)
requests cannot exceed this value.
    requests.nvidia.com/gpu: 0 #Across all pods in the namespace, the sum of GPU
requests cannot exceed this value.
    requests.memory: 100Gi #Across all pods in the namespace, the sum of memory
requests cannot exceed this value.
    requests.ephemeral-storage: 1000Gi #Across all pods in the namespace, the sum of
ephemeral-storage requests cannot exceed this value.
    requests.storage: 10000Gi # Across all persistent volume claims in the namespace,
the sum of storage requests cannot exceed this value.
    pods: 100 #The total number of pods that can exist in the namespace.
    persistentvolumeclaims: 100 #The total number of persistent volume claims that
can exist in the namespace.
  target: #target are the desired hard limits requested by the cluster user for each
resource type in the namespace.
    requests.cpu: 200 #Across all pods in the namespace, this is the sum of CPU (cores)
requests desired by the cluster user.
    requests.nvidia.com/gpu: 100 #Across all pods in the namespace, this is the sum of
GPU requests desired by the cluster user.
    requests.memory: 200Gi #Across all pods in the namespace, this the sum of
```

-continued

--- memory requests desired by the cluster user.
    requests.ephemeral-storage: 2000Gi #Across all pods in the namespace, this the
sum of ephemeral-storage requests desired by the cluster user.
    requests.storage: 20000Gi # Across all persistent volume claims in the namespace,
this the sum of storage requests desired by the cluster user.
    pods: 200 #The total number of pods desired by the cluster user.
    persistentvolumeclaims: 300 #The total number of persistent volume claims desired
by the cluster user."

---

Note that the cluster user does not have to create this file. This file may only be needed by the cluster administrator for creating a new resource quota, as described above with reference to the resourcequota-example-template.yaml file. In some embodiments, the cluster user will make an API call to the k8s API server 22 to change or update the resource quota. Note that the cluster administrator need not give the cluster user the right to change the hard section of the resource quota. The cluster administrator might only give the right to the cluster user to change the target section of the resource quota. New API operations on the new target sub-resource (child resource) of the resource quota to support creation of a new resource quota may include Patch (or Put) operations having the following path: /api/v1/namespaces/{namespace}/resourcequotas/{name}/target, where {name} is the name of the resource quota, for example, "red-team-quota."

An example YAML file specifying a running resource configuration after the cluster user has updated the resource configuration with a target resource quota, is as follows:

---

```
"#resourcequota-example-running-config-with-target.yaml
apiVersion: v1
kind: ResourceQuota
metadata:
  annotations:
    kubectl.kubernetes.io/last-applied-configuration: |
{"apiVersion":"v1","kind":"ResourceQuota","metadata":{"annotations":{ },"name":"r
ed-team-quota","namespace":"red-
namespace"},"spec":{"hard":{"persistentvolumeclaims":100,"pods":100,"requests.cp
u":100,"requests.ephemeral-
storage":"1000Gi","requests.memory":"100Gi","requests.nvidia.com/gpu":0,"requests
.storage":"10000Gi"}}}
  creationTimestamp: "2020-01-26T18:05:00Z"
  name: red-team-quota
  namespace: red-namespace
  resourceVersion: "26999"
  selfLink: /api/v1/namespaces/red-namespace/resourcequotas/red-team-quota
  uid: e2324455-3f94-11ea-9c91-0242ac11002e
spec:
  hard:
    persistentvolumeclaims: "100"
    pods: "100"
    requests.cpu: "100"
    requests.ephemeral-storage: 1000Gi
    requests.memory: 100Gi
    requests.nvidia.com/gpu: "0"
    requests.storage: 10000Gi
  target:
    requests.cpu: "200"
    requests.nvidia.com/gpu: "100"
    requests.memory: 200Gi
    requests.ephemeral-storage: 2000Gi
    requests.storage: 20000Gi
    pods: "200"
    persistentvolumeclaims: "300"
status: #Status indicates the actual enforced resource quota, requested resource quota
and its current usage
  hard:
    persistentvolumeclaims: "100"
    pods: "100"
    requests.cpu: "100"
    requests.ephemeral-storage: 1000Gi
    requests.memory: 100Gi
    requests.nvidia.com/gpu: "0"
    requests.storage: 10000Gi
  target:
    persistentvolumeclaims: "300"
    pods: "200"
    requests.cpu: "200"
    requests.ephemeral-storage: 2000Gi
    requests.memory: 200Gi
    requests.nvidia.com/gpu: "100"
    requests.storage: 20000Gi
  used:
```

```
persistentvolumeclaims: "0"
pods: "0"
requests.cpu: "0"
requests.ephemeral-storage: "0"
requests.memory: "0"
requests.nvidia.com/gpu: "0"
requests.storage: "0""
```

FIG. 13 is a flowchart of an example process implemented in a workload cluster 20 for selecting resource limits from a proposed set of resource limits. The process includes receiving (Block S124) a request from a cluster user quota controller 16, the request containing a proposed set of resource limits for a cluster namespace 24 of a corresponding cluster user. The process includes relaying (Block S126) to a cluster administrator quota controller 16 the proposed set of resource limits to be evaluated. The process further includes receiving (Block S128) a request from a cluster administrator quota controller (16), the request containing a first set of resource limits selected from the proposed set of resource limits to apply to a cluster namespace of the cluster user.

FIG. 14 is a flowchart of an example process in a workload cluster for changing resource limits. The method includes receiving (Block S130) a request from a cluster user quota controller 16 for a proposed set of resource limits, the request having a cluster namespace 24. The method also includes transmitting (Block S132) a proposed set of resource limits to the cluster administrator quota controller 16 when a resource limit in the first set of resource limits differs from a corresponding resource limit in the proposed set by a threshold amount. The process further includes receiving (S134) a request from a cluster administrator quota controller for a first set of resource limits to be applied for the cluster namespace.

Figure 15:
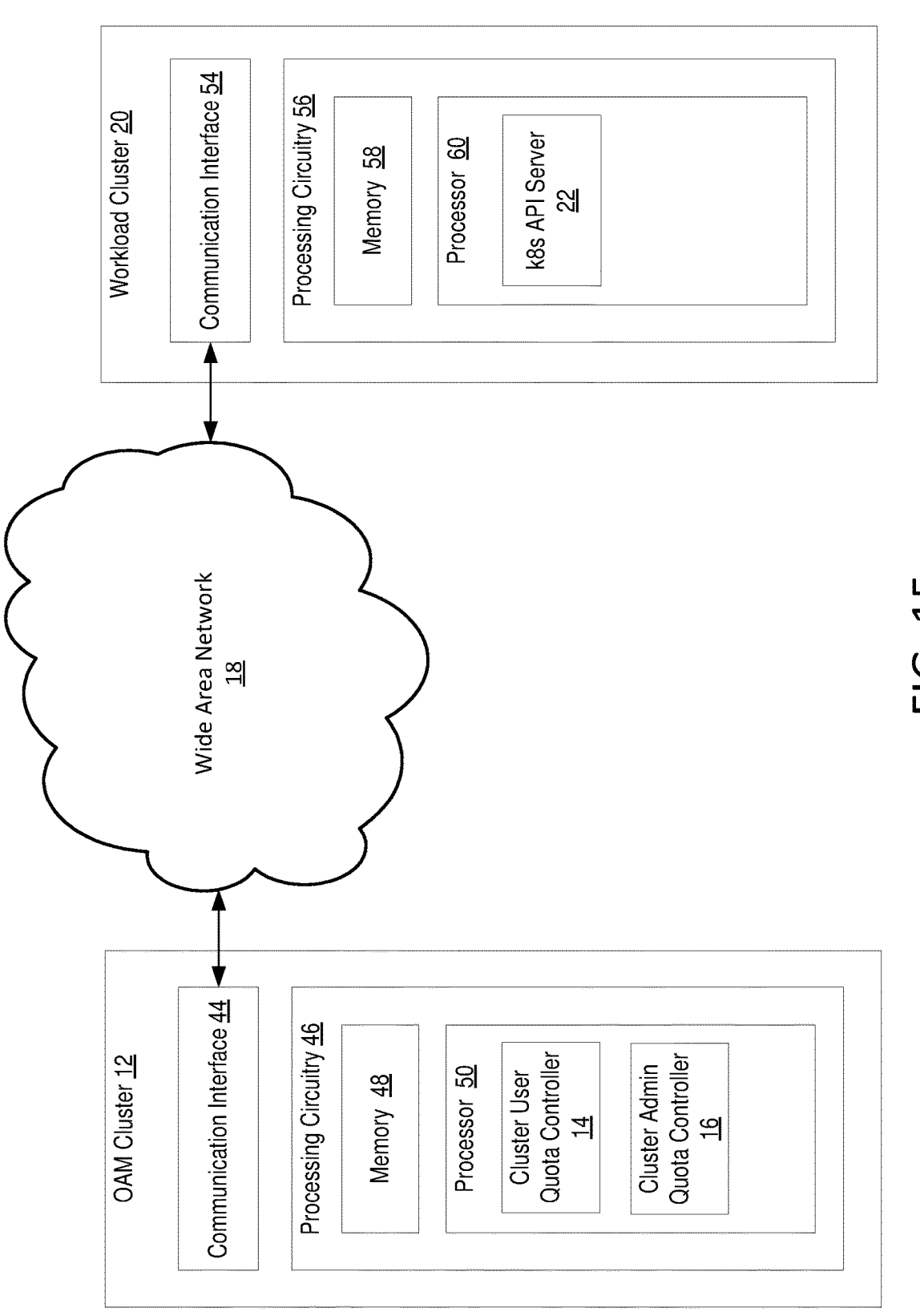
FIG. 15 is a block diagram of one implementation of an OAM cluster in communication via a network with a workload cluster.

FIG. 15 is a block diagram of an example implementation of an OAM cluster 12 in communication via network 18 with a workload cluster 20. The OAM cluster 12 has a communication interface 44, which may communicate with the network 18, either wirelessly or by wireline. The communication interface 44 may be formed as or may include, for example, one or more RF transmitters, one or more RF receivers, and/or one or more RF transceivers and/or one or more wire/optical communication elements. The communication interface 44 may be configured to facilitate a connection to other devices, e.g., workload cluster 20, via network 18.

The OAM cluster 12 also has processing circuitry 46. The processing circuitry 46 may include a memory 48 and a processor 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the OAM cluster 12 further has software stored internally in, for example, memory 48, or stored in external memory (e.g., database, storage array, network storage device, etc.) accessible by the OAM cluster 12 via an external connection. The software may be executable by the processing circuitry 46. The processing circuitry 46 may be configured to control any of the methods and/or processes described herein and/or to cause such methods, and/or processes to be performed, e.g., by OAM cluster 12. Processor 50 corresponds to one or more processors 50 for performing OAM cluster 12 functions described herein. The memory 48 is configured to store data, programmatic software code and/or other information described herein. In some embodiments, the software may include instructions that, when executed by the processor 50 and/or processing circuitry 46, causes the processor 50 and/or processing circuitry 46 to perform the processes described herein with respect to OAM cluster 12, e.g., the functions of the cluster user quota controller 14 and/or the cluster admin quota controller 16. Also, although OAM cluster 12 is shown as a single device, it is understood that such depiction is made for the sake of simplicity and that OAM cluster 12 can include multiple physical elements, each with their own or shared processing circuitry 46, communication interface 44, etc.

The workload cluster 20 has a communication interface 54, which may communicate with the network 18, either wirelessly or by wireline. The communication interface 54 may be formed as or may include, for example, one or more RF transmitters, one or more RF receivers, and/or one or more RF transceivers and/or one or more wire/optical communication elements. The communication interface 54 may be configured to facilitate a connection to other devices, e.g., OAM cluster 20, via network 18.

The workload cluster 20 also has processing circuitry 56. The processing circuitry 56 may include a memory 58 and a processor 60. In particular, in addition to or instead of a processor, such as a central processing unit, and memory, the processing circuitry 56 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) the memory 58, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the workload cluster 20 further has software stored internally in, for example, memory 58, or stored in external memory (e.g., database, storage array, network storage device, etc.) accessible by the workload cluster 20 via an external connection. The software may be executable by the processing circuitry 56. The processing circuitry 56 may be configured to control any of the methods and/or processes described herein and/or to cause such methods, and/or processes to be performed, e.g., by workload cluster 20. Processor 60 corresponds to one or more processors 60 for performing workload cluster 20 functions described herein. The memory 58 is configured to store data, programmatic software code and/or other information described herein. In some embodiments, the software may include instructions that, when executed by the processor 60 and/or processing circuitry 56, causes the processor 60 and/or processing circuitry 56 to perform the processes described herein with respect to workload cluster 20, e.g., the functions of the cluster k8s API server 22. Also, workload cluster 20 is shown as a single device, it is understood that such depiction is made for the sake of simplicity and that workload cluster 20 can include multiple physical elements, each with their own or shared processing circuitry 56, communication interface 54, etc.

According to one aspect, a method implemented in a workload cluster 20 in a network of workload clusters 20 supporting containerized workloads running in cluster namespaces 24 in communication with at least one workload cluster 20 is provided. The method includes receiving a request from a cluster user quota controller 14, the request containing a proposed set of resource limits for a cluster namespace 24 of the cluster user. The method includes relaying to a cluster administrator quota controller 16 the proposed set of resource limits to be evaluated. The method further includes receiving a request from a cluster administrator quota controller (16), the request containing a first set of resource limits selected from the proposed set of resource limits to apply to a cluster namespace of the cluster user.

According to this aspect, in some embodiments, the first set of resource limits includes a limit on at least one of the following: a number of processing units, an available memory capacity, an ephemeral storage capacity, an available permanent storage capacity, a number of pods that can exist in the cluster namespace 24 and a number of persistent volume claims that can exist in the cluster namespace 24. In some embodiments, the request includes a status statement that specifies the cluster namespace 24 and current resource usage by a workload cluster managed by the cluster user. In some embodiments, relaying the proposed set of resource limits is performed only when a resource limit in the proposed set of resource limits exceeds a corresponding current resource limit by a threshold amount. In some embodiments, the threshold amount is a lower limit on an amount of resources that will be changed in response to the proposed set of resource limits. In some embodiments, the proposed set of resource limits is transmitted with a current usage of resources by a workload cluster. In some embodiments, the method further includes requesting a notification of a proposed set of resource limits from the cluster administrator quota controller 16 for each of at least one workload cluster 20.

According to another aspect, a workload cluster 20 in a network of workload clusters supporting containerized workloads running in cluster namespaces 24 in communication with at least one workload cluster 20. The workload cluster 20 receives a request from a cluster user quota controller 16, the request containing a proposed set of resource limits for a cluster namespace 24 of a cluster user. The workload cluster 20 is further configured to relay to a cluster administrator quota controller 16 the proposed set of resource limits to be evaluated. The workload cluster 20 is further configured to receive a request from a cluster administrator quota controller 16, the request containing a first set of resource limits selected from the proposed set of resource limits to apply to a cluster namespace of the cluster user.

According to this aspect, in some embodiments, the first set of resource limits includes a limit on at least one of the following: a number of processing units, an available memory capacity, an ephemeral storage capacity, an available permanent storage capacity, a number of pods that can exist in a cluster namespace 24 and a number of persistent volume claims that can exist in the cluster namespace 24. In some embodiments, the request includes a status statement that specifies the cluster namespace 24 and current resource usage by a workload cluster 20 managed by the cluster user. In some embodiments, the relaying of the proposed set of resource limits is performed when a resource limit exceeds a correspondent current resource limit by a threshold amount. In some embodiments, the threshold amount is a lower limit on an amount of resources that will be changed in response to the proposed set of resource limits. In some embodiments, the proposed set of resource limits is transmitted with a current usage of resources by a workload cluster 20. In some embodiments, the workload cluster 20 is further configured to request notification of a proposed set of resource limits from the cluster administrator resource controller 16 for each of at least one workload cluster 20.

According to yet another aspect, a method implemented in a workload cluster in a network of workload clusters 20 supporting containerized workloads running in cluster namespaces 24 is provided. The method includes receiving a request from a cluster user quota controller 16 for a proposed set of resource limits, the request having a cluster namespace 24. The method includes transmitting a proposed set of resource limits to the cluster administrator quota controller 16 when a resource limit in the first set of resource limits differs from a corresponding resource limit in the proposed set by a threshold amount. The method further includes receiving a request from a cluster administrator quota controller for a first set of resource limits to be applied for the cluster namespace.

According to this aspect, in some embodiments, the received request contains a current use of resources by the workload cluster 20. In some embodiments, the method further includes transmitting a notification of a proposed set of resource limits for each of at least one workload cluster 20.

According to another aspect, a workload cluster 20 in a network of workload clusters 20 supporting containerized workloads running in a cluster of namespaces 24 is provided. The workload cluster 20 is configured to receive a request from a cluster user quota controller 16 for a proposed set of resource limits, the request having a cluster namespace 24. The workload cluster 20 is further configured to transmit a proposed set of resource limits to the cluster administrator resource controller 16 when a resource limit in the first set of resource limits differs from a corresponding resource limit in the proposed set by a threshold amount. The workload cluster is further configured to receive a request from a cluster administrator quota controller for a first set of resource limits to be applied for the cluster namespace.

According to this aspect, in some embodiments, the received request contains a current use of resources by the workload cluster 20. In some embodiments, the workload cluster 20 is further configured to transmit a notification of a proposed set of resource limits for each of at least one workload cluster 20.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviation | Explanation |
| --- | --- |
| app | application |
| k8s | kubernertes |
| CNF | Containerized Node Function |
| CPU | Central Processing Unit |
| GPU | Graphical Processing Unit |
| LCM | Lifecycle Management |
| NFVO | NFV Orchestrator |
| ONAP | Open Network Automation Platform |
| VNF | Virtual Node Function |
| VNFM | VNF Manager |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in processing circuitry of at least one workload cluster operated by a cluster user in a network of workload clusters supporting containerized workloads running in cluster namespaces in communication with the at least one workload cluster, the method comprising:

receiving a request from a cluster user quota controller, the request containing a proposed set of resource limits for a cluster namespace of a cluster user, and the request comprising a change related to a container resource capacity allocated to the cluster namespace;

relaying to a cluster administrator quota controller the proposed set of resource limits to be evaluated;

receiving, from the cluster administrator quota controller, a first set of resource limits selected from the proposed set of resource limits to apply to the cluster namespace of the cluster user, the first set of resource limits comprising resource quotas requested by the cluster administrator quota controller for each resource type in the cluster namespace of the cluster user, the resource quotas informing the cluster admin to increase or decrease the container resource allocation for the cluster namespace; and using resources in the cluster namespace such that the resource quotas are used to limit allocation of a total amount of the resources that the cluster namespace can consume in the workload cluster.

2. The method of claim 1, wherein the first set of resource limits includes a limit on at least one of the following: a number of available processing units, an available memory capacity, an available ephemeral storage capacity, an available permanent storage capacity, a number of pods that can exist in the cluster namespace and a number of persistent volume claims that can exist in the cluster namespace.

3. The method of claim 1, wherein the request includes a status statement that specifies the cluster namespace and current resource usage by the at least one workload cluster managed by the cluster user.

4. The method of claim 1, wherein relaying the proposed set of resource limits is performed only when a resource limit in the proposed set of resource limits exceeds a corresponding current resource limit by a threshold amount.

5. The method of claim 4, wherein the threshold amount is a lower limit on an amount of resources that will be changed in response to the proposed set of resource limits.

6. The method of claim 1, wherein the proposed set of resource limits is transmitted with a current usage of resources by a workload cluster managed by the cluster administrator quota controller.

7. The method of claim 1, further comprising requesting a notification of a proposed set of resource limits from the cluster administrator quota controller for each of the at least one workload cluster.

8. A workload cluster in a network of workload clusters supporting containerized workloads running in a cluster namespace in communication with the workload cluster, the workload cluster comprising processing circuitry being configured to receive a request from a cluster user quota controller, the request containing a proposed set of resource limits for the cluster namespace of a cluster user, and the request comprising a change related to a container resource capacity allocated to the cluster namespace;

relay to a cluster administrator quota controller the proposed set of resource limits to be evaluated;

receive from the cluster administrator quota controller, a first set of resource limits selected from the proposed set of resource limits to apply to the cluster namespace of the cluster user, the first set of resource limits comprising resource quotas requested by the cluster administrator quota controller for each resource type in the cluster namespace of the cluster user, the resource quotas informing the cluster admin to increase or decrease the container resource allocation for the cluster namespace; and use resources in the cluster namespace such that the resource quotas are used to limit allocation of a total amount of the resources that the cluster namespace can consume in the workload cluster.

9. The workload cluster of claim 8, wherein the first set of resource limits includes a limit on at least one of the following: a number of available processing units, an available memory capacity, an available ephemeral storage capacity, an available permanent storage capacity, a number of pods that can exist in the cluster namespace and a number of persistent volume claims that can exist in the cluster namespace.

10. The workload cluster of claim 8, wherein the request includes a status statement that specifies the cluster namespace and current resource usage by a workload cluster managed by the cluster user.

11. The workload cluster of claim 8, wherein the relaying of the proposed set of resource limits is performed when a resource limit exceeds a correspondent current resource limit by a threshold amount.

12. The workload cluster of claim 11, wherein the threshold amount is a lower limit on an amount of resources that will be changed in response to the proposed set of resource limits.

13. The workload cluster of claim 8, wherein the proposed set of resource limits is transmitted with a current usage of resources by the workload cluster.

14. The workload cluster of claim 8, further comprising requesting a notification of a proposed set of resource limits from the cluster administrator quota controller the workload cluster.

15. A method implemented in processing circuitry of a workload cluster in a network of workload clusters supporting containerized workloads running in a cluster namespace, the method comprising:

receiving a request from a cluster user quota controller for a proposed set of resource limits, the request including a status statement that specifies the cluster namespace, and the request comprising a change related to a container resource capacity allocated to the cluster namespace;

transmitting a proposed set of resource limits to the cluster administrator quota controller when a proposed resource limit differs from a corresponding resource limit in the proposed set by a threshold amount; and receiving, from the cluster administrator quota controller, a first set of resource limits to be applied for the cluster namespace, the first set of resource limits comprising resource quotas requested by the cluster administrator quota controller for each resource type in the cluster namespace of the cluster user, the resource quotas informing the cluster admin to increase or decrease the container resource allocation for the cluster namespace; and using resources in the cluster namespace such that the resource quotas are used to limit allocation of a total amount of the resources that the cluster namespace can consume in the workload cluster.

16. The method of claim 15, wherein the received request contains a current use of resources by the workload cluster.

17. The method of claim 15, further comprising transmitting a notification of a proposed set of resource limits for the workload cluster.

18. A workload cluster in a network of workload clusters supporting containerized workloads running in a cluster namespace, the workload cluster comprising processing circuitry being configured to:

receive a request from a cluster user quota controller for a proposed set of resource limits, the request including a status statement that specifies a cluster namespace, and the request comprising a change related to a container resource capacity allocated to the cluster namespace;

transmit a proposed set of resource limits to the cluster administrator quota controller when a proposed resource limit differs from a corresponding resource limit in the proposed set by a threshold amount;

receive, from the cluster administrator quota controller, a first set of resource limits to be applied for the cluster namespace, the first set of resource limits comprising resource quotas requested by the cluster administrator quota controller for each resource type in the cluster namespace of the cluster user, the resource quotas informing the cluster admin to increase or decrease the container resource allocation for the cluster namespace; and use resources in the cluster namespace such that the resource quotas are used to limit allocation of a total amount of the resources that the cluster namespace can consume in the workload cluster.

19. The workload cluster of claim 18, wherein the received request contains a current use of resources by the workload cluster.

20. The workload cluster of claim 18, wherein the workload cluster is further configured to transmit a notification of a proposed set of resource limits for the workload cluster.

\* \* \* \* \*

30